US007080069B2

(12) United States Patent
Abe et al.

(10) Patent No.: US 7,080,069 B2
(45) Date of Patent: Jul. 18, 2006

(54) FULL TEXT SEARCH SYSTEM

(75) Inventors: Fumirou Abe, Kawasaki (JP); Masataka Matsuura, Kawasaki (JP); Yoko Tabata, Kawasaki (JP); Masahiko Nagata, Fukuoka (JP); Yasuhisa Hara, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 10/083,469

(22) Filed: Feb. 27, 2002

(65) Prior Publication Data
US 2003/0018638 A1    Jan. 23, 2003

(30) Foreign Application Priority Data
Jul. 19, 2001  (JP) ............................... 2001-220256

(51) Int. Cl.
*G06F 17/30* (2006.01)
(52) U.S. Cl. ............................... 707/4; 707/3; 707/102
(58) Field of Classification Search ................ 707/1, 707/2, 3, 4, 5, 6, 7, 8, 9, 10, 100, 101, 102, 707/103, 104
See application file for complete search history.

(56) References Cited

U.S. PATENT DOCUMENTS

| 5,452,451 | A  | * | 9/1995 | Akizawa et al. ................. | 707/6   |
| 6,216,123 | B1 | * | 4/2001 | Robertson et al. .............. | 707/3   |
| 6,289,353 | B1 | * | 9/2001 | Hazlehurst et al. ............ | 707/3   |
| 6,691,107 | B1 | * | 2/2004 | Dockter et al. ................. | 707/3   |
| 6,691,109 | B1 | * | 2/2004 | Bjornson et al. ............... | 707/4   |
| 6,714,927 | B1 | * | 3/2004 | Ogawa ............................ | 707/3   |
| 6,738,779 | B1 | * | 5/2004 | Shapira ......................... | 707/101 |

FOREIGN PATENT DOCUMENTS

| EP | 0644487    | 9/1994 |
| JP | A-8-137734 | 5/1996 |
| JP | A-9-134364 | 5/1997 |

OTHER PUBLICATIONS

Search Report for European Patent Application No. 02251559.1-1225 issued on Jun. 6, 2005, 2 pages.
Smith R. et al.; "A computer architecture to support natural full text information retrieval"; IEEE, Apr. 11, 1988; pp. 197-199.

(Continued)

*Primary Examiner*—Jeffrey Gaffin
*Assistant Examiner*—Yicun Wu
(74) *Attorney, Agent, or Firm*—Staas & Halsey LLP

(57) ABSTRACT

A full text search system using a character string collation method which searches a large quantity of data using a plurality of search processing apparatuses is disclosed. This system comprises a search integration unit which divides search-target character string data into a group of character string records, allocates the divided records to one or more search processing apparatuses, transmits given character string search conditions to each search processing apparatus, and receives and integrates search results. Furthermore, this System comprises an update temporary storage unit which temporarily stores new character string records to update the search-target character string data and an update record search instruction unit which instructs the new character string records stored in the update temporary memory unit to any one of the search processing apparatuses determined in advance as a part of the search-target character string data.

9 Claims, 43 Drawing Sheets

OTHER PUBLICATIONS

Spalti M. W.; "Finding and managing web content with Copernic 2000"; Library Computing; Sage Publications, vol. 18, No. 3, pp. 217-221.

Copernic Technologies Inc.; "Copernic 2000 Pro Product Overview"; Copernic, Jan. 6, 2000.

Hyunsuk Seung et al.; "A Client-oriented distribution architecture for Web search agents"; Autonomous Decentralized Systems, 1997; IEEE Comput. Soc. Apr. 9, 1997; pp. 299-308.

* cited by examiner

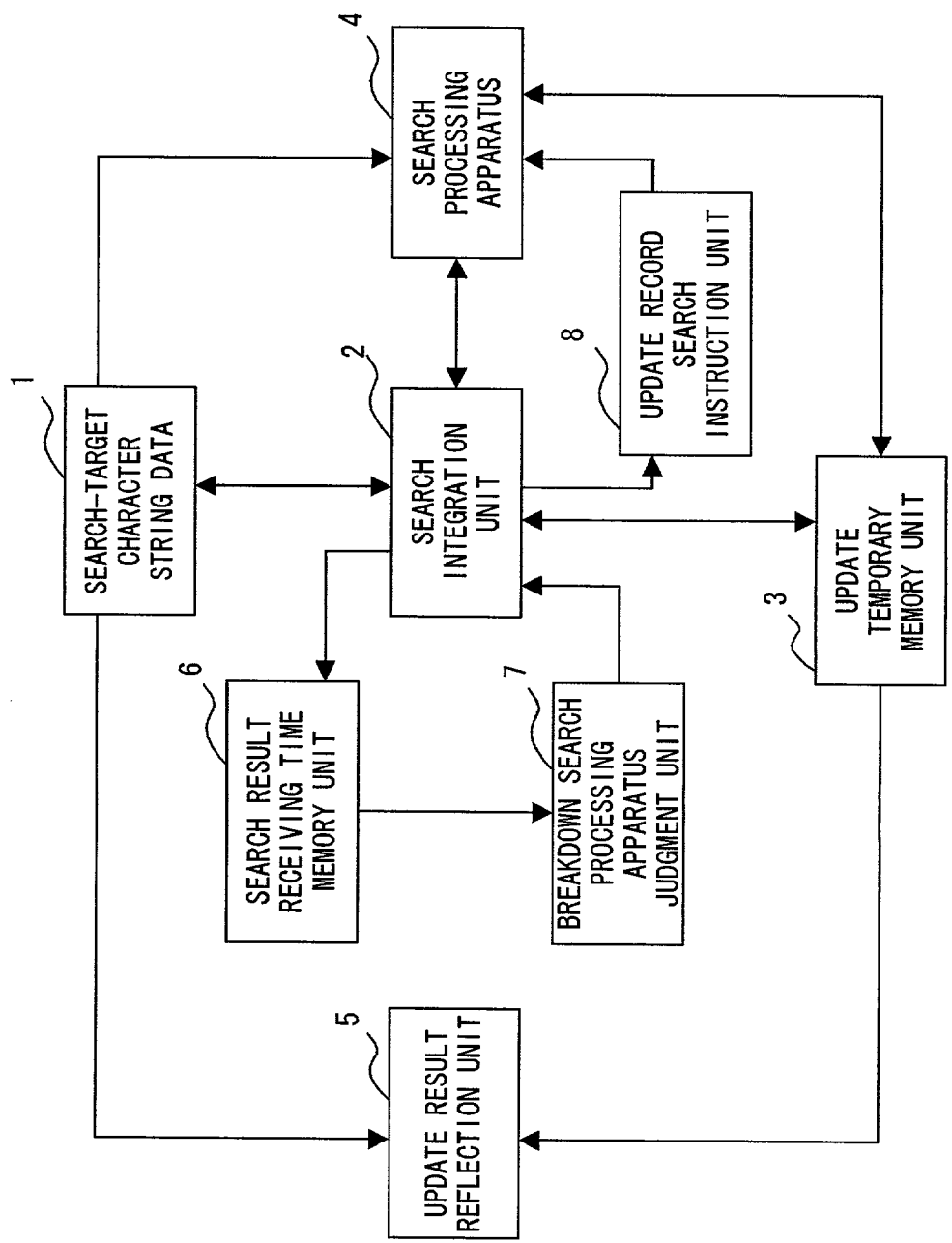
F I G. 1

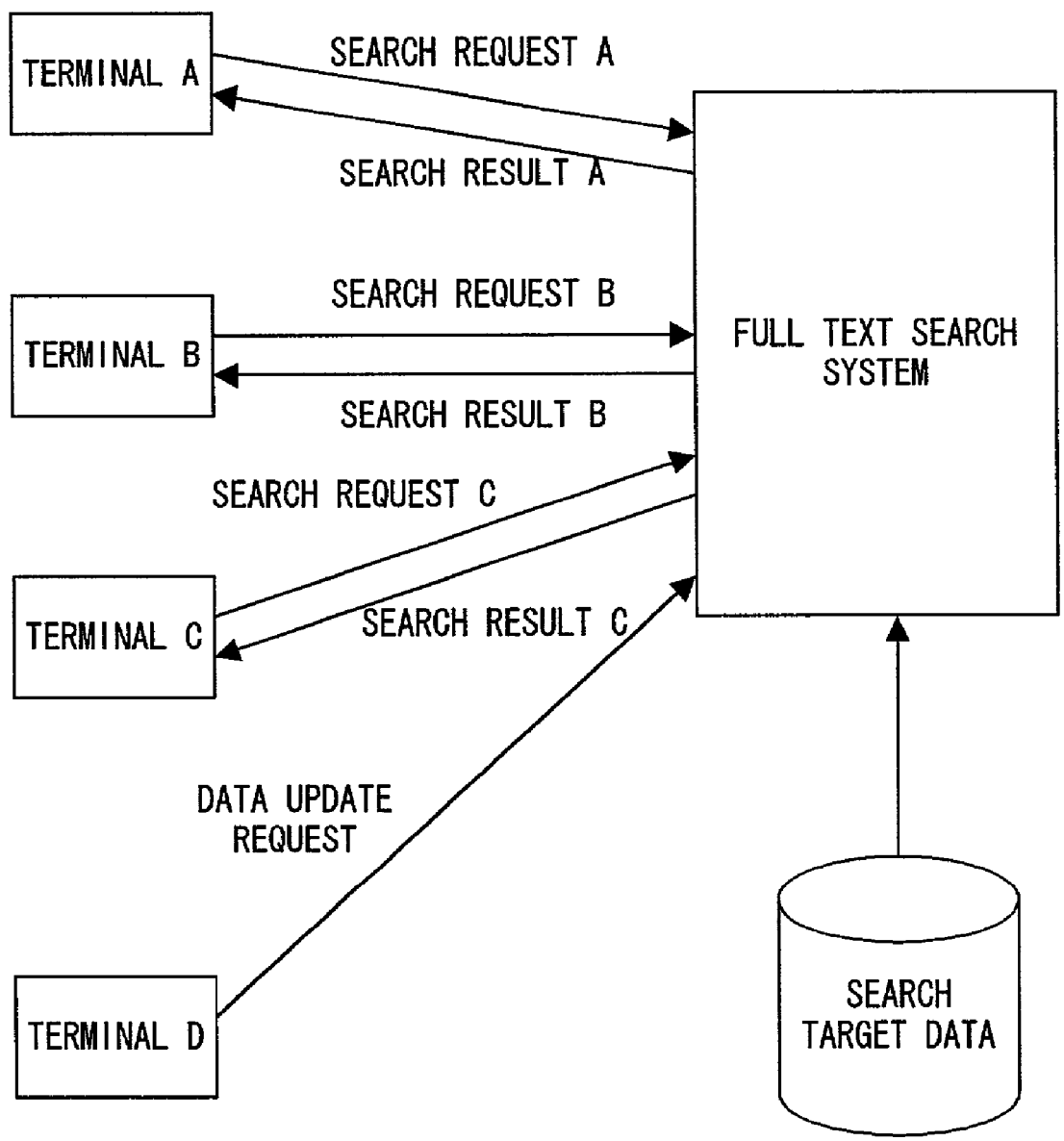
F I G. 2

```
[K] <NO>1 [K] <NAME>OOOO [K] <ALMA MATER>AA UNIVERSITY [K] <BIRTHPLACE>OO [K] <SEX>MALE [K] [R]
[K] <NO>2 [K] <NAME>×××  [K] <ALMA MATER>BB UNIVERSITY [K] <BIRTHPLACE>×× [K] <SEX>FEMALE [K] [R]
[K] <NO>3 [K] <NAME>△△△ [K] <ALMA MATER>CC UNIVERSITY [K] <BIRTHPLACE>△△ [K] <SEX>MALE [K] [R]
. . .
```

F I G. 3

|  | ITEM TAG | SEARCH WORD |
|---|---|---|
| A | <NAME> | ○○○○ |
| B | <ALMA MATER> | AA UNIVERSITY |
| SEARCH CONDITION FORMULA | A and B ||

F I G. 4

PERSONNEL INFORMATION SEARCH CONDITIONS

NAME  ○○○○

ALMA MATER  AA UNIVERSITY ▼

BIRTHPLACE  ▼

SEX  ▼

F I G. 5

PERSONNEL INFORMATION SEARCH RESULTS

1/1

| NO | 1 |
| --- | --- |
| NAME | ○○○○ |
| ALMA MATER | AA UNIVERSITY |
| BIRTHPLACE | ○○ |
| SEX | MALE |

F I G. 6

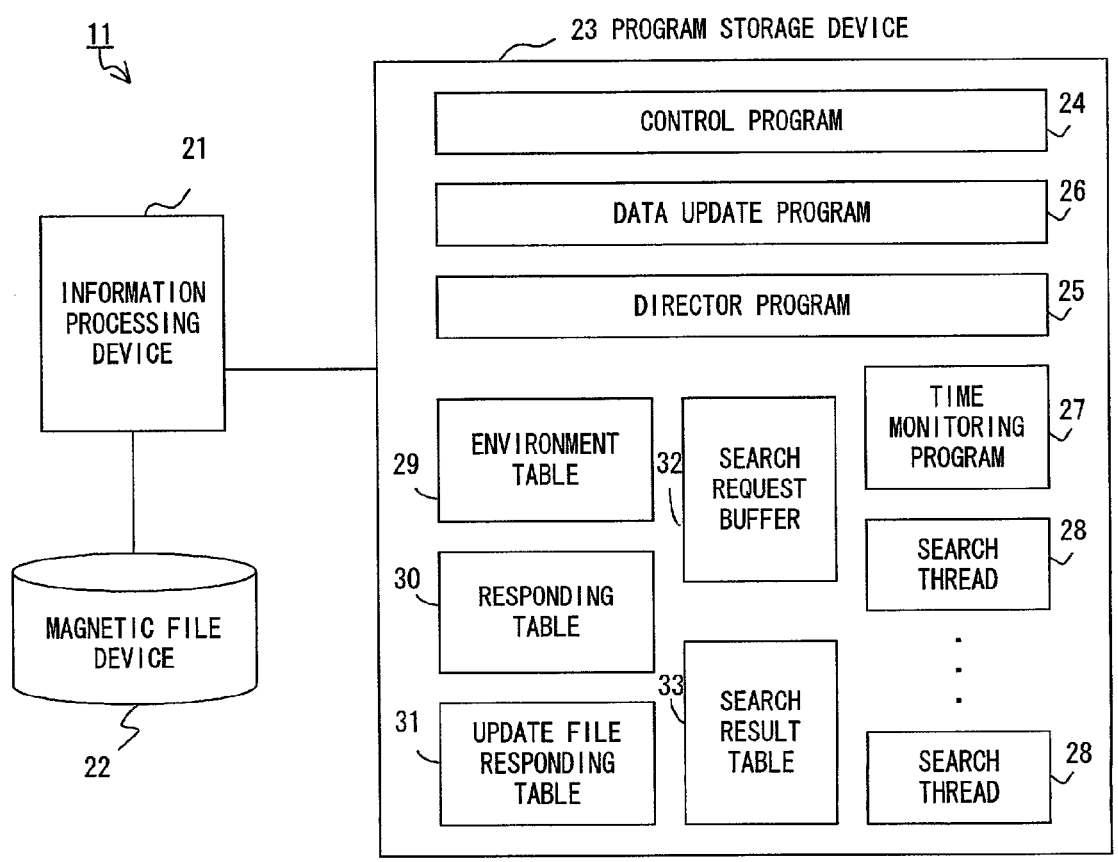
F I G. 8

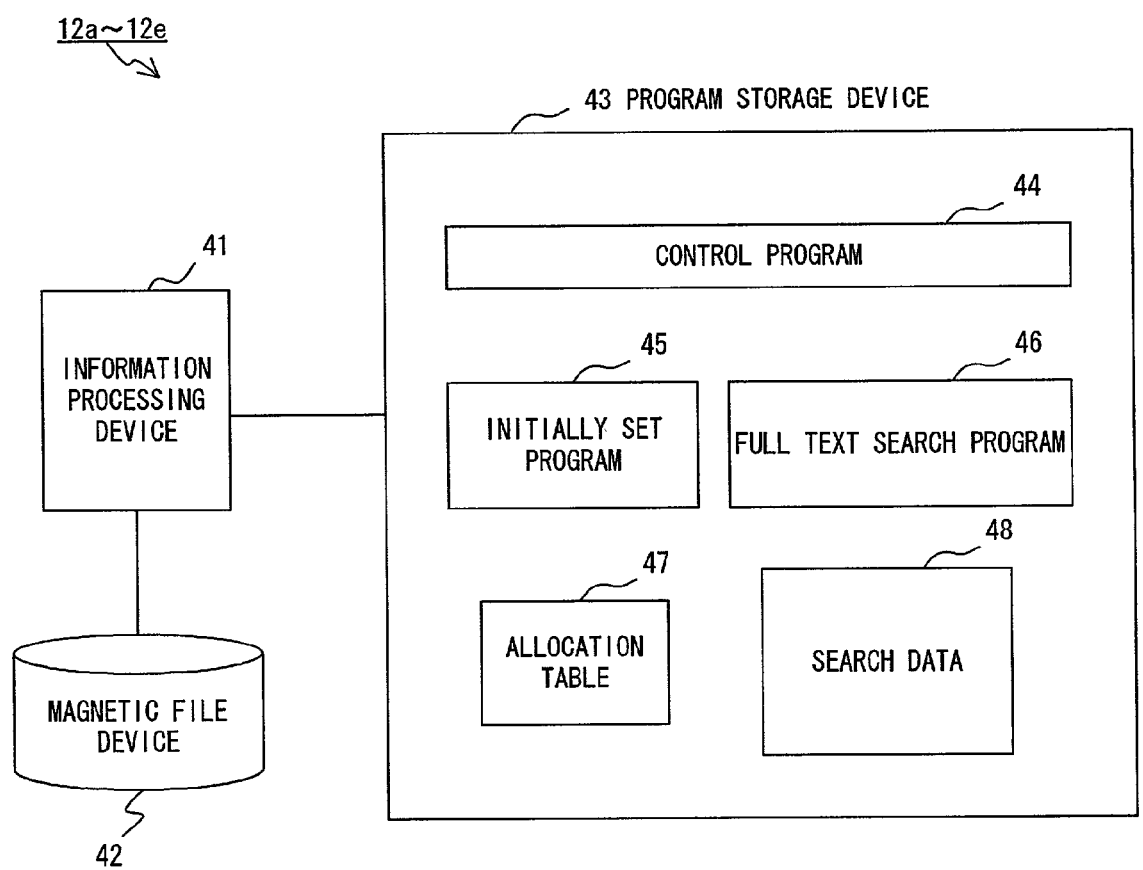
F I G. 9

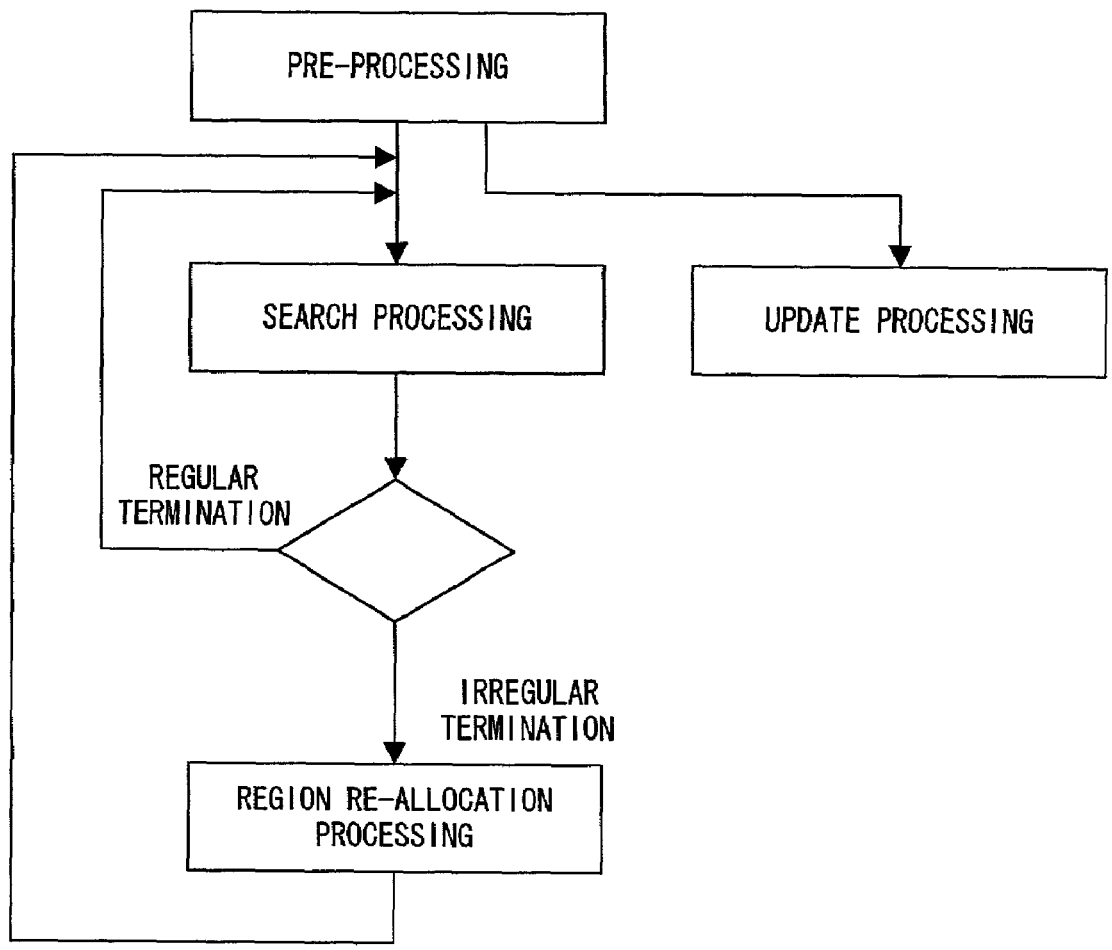
F I G. 10

| SEARCH SERVER NAME | ADDRESS | STATE FLAG | FLAG IN CHARGE OF UPDATE FILE |
|---|---|---|---|
| SEARCH SERVER a | 15.85.145.01 | 0 | 0 |
| SEARCH SERVER b | 15.85.145.02 | 0 | 0 |
| SEARCH SERVER c | 15.85.145.03 | 1 | 0 |
| SEARCH SERVER d | 15.85.145.04 | 0 | 0 |
| SEARCH SERVER e | 14.85.145.05 | 0 | 1 |

30a — RECORD NO.
30b — TOP ADDRESS OF RECORD
30c — LENGTH OF RECORD

| RECORD NO. | TOP ADDRESS OF RECORD | LENGTH OF RECORD |
|---|---|---|
| 1 | 0 | 250 |
| 2 | 250 | 580 |
| 3 | 830 | 322 |
| 4 | 1152 | 108 |
| ⋮ | | |
| 2351 | 452442 | 242 |

F I G. 1 4

| RECORD NO. | TOP ADDRESS OF RECORD | LENGTH OF RECORD |
|---|---|---|
| 1 | 0 | 250 |
| 2 | 250 | 580 |
| 3 | 830 | 322 |
| 4 | 1152 | 108 |
| . . . | | |
| 784 | 168997 | 206 |

[K]<NO>1[K]<NAME>○○○○[K]<ALMA MATER>AA UNIVERSITY[K]<BIRTHPLACE>○○[K]<SEX>MALE[K][R]
[K]<NO>2[K]<NAME>×××[K]<ALMA MATER>BB UNIVERSITY[K]<BIRTHPLACE>××[K]<SEX>FEMALE[K][R]
[K]<NO>3[K]<NAME>△△△△[K]<ALMA MATER>CC UNIVERSITY[K]<BIRTHPLACE>△△[K]<SEX>MALE[K][R]
. . .

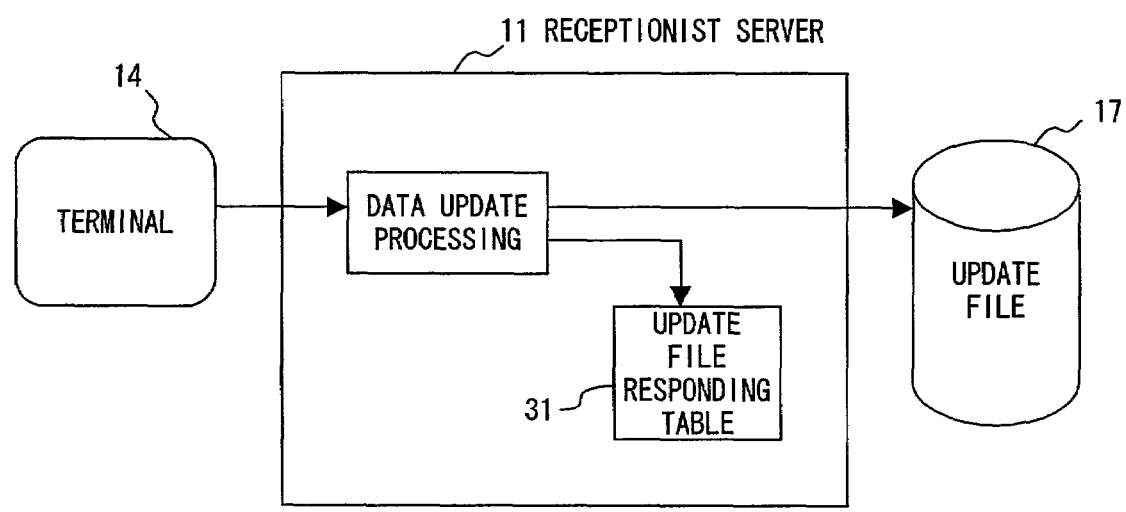
F I G. 1 8

31

| RECORD NO. | TOP ADDRESS OF RECORD | LENGTH OF RECORD |
|---|---|---|
| 2352 | 0 | 224 |
| 2353 | 224 | 108 |
| 282 | 332 | 306 |
| 2354 | 638 | 278 |

| SEARCH REQUEST OF TERMINAL A |
|---|
| SEARCH REQUEST OF TERMINAL B |
| SEARCH REQUEST OF TERMINAL C |

FIG. 23

| SEARCH SERVER NAME | FLAG IN CHARGE OF UPDATE FILE | PROCESSING RESULT FLAG | PROCESSING FINISHING TIME | HIT RECORD NO. |
|---|---|---|---|---|
| SEARCH SERVER a | 0 | | | |
| SEARCH SERVER b | 0 | | | |
| SEARCH SERVER d | 0 | | | |
| SEARCH SERVER e | 1 | | | |

F I G. 2 4

| HIT RECORD NO. |
|---|
| 2,245,501 |

FIG. 26

| SEARCH SERVER NAME | FLAG IN CHARGE OF UPDATE FILE | PROCESSING RESULT FLAG | PROCESSING FINISHING TIME | HIT RECORD NO. |
|---|---|---|---|---|
| SEARCH SERVER a | 0 | 1 | 102601541 | 2,245,501 |
| SEARCH SERVER b | 0 | 1 | 102601545 | |
| SEARCH SERVER d | 0 | 2 | | |
| SEARCH SERVER e | 1 | 1 | 102601538 | 2353 |

F I G. 2 7

29

| SEARCH SERVER NAME | FLAG IN CHARGE OF UPDATE FILE | ADDRESS | STATE FLAG |
|---|---|---|---|
| SEARCH SERVER a | 0 | 15.85.145.01 | 0 |
| SEARCH SERVER b | 0 | 15.85.145.02 | 0 |
| SEARCH SERVER c | 0 | 15.85.145.03 | 1 |
| SEARCH SERVER d | 0 | 15.85.145.04 | 1 |
| SEARCH SERVER e | 1 | 15.85.145.05 | 0 |

BEFORE ALLOCATION CHANGE

16 SEARCH TARGET FILE

| ALLOCATION REGION OF SEARCH SERVER a | ALLOCATION REGION OF SEARCH SERVER b | ALLOCATION REGION OF SEARCH SERVER d |

RECORD NO → 1    785    1569

AFTER ALLOCATION CHANGE

16 SEARCH TARGET FILE

| ALLOCATION REGION OF SEARCH SERVER a | ALLOCATION REGION OF SEARCH SERVER b |

RECORD NO → 1    1180

| RECORD NO. | TOP ADDRESS OF RECORD | LENGTH OF RECORD |
|---|---|---|
| 1 | 0 | 250 |
| 2 | 250 | 580 |
| 3 | 830 | 322 |
| 4 | 1152 | 108 |
| ... | | |
| 1179 | 246146 | 188 |

FIG. 33

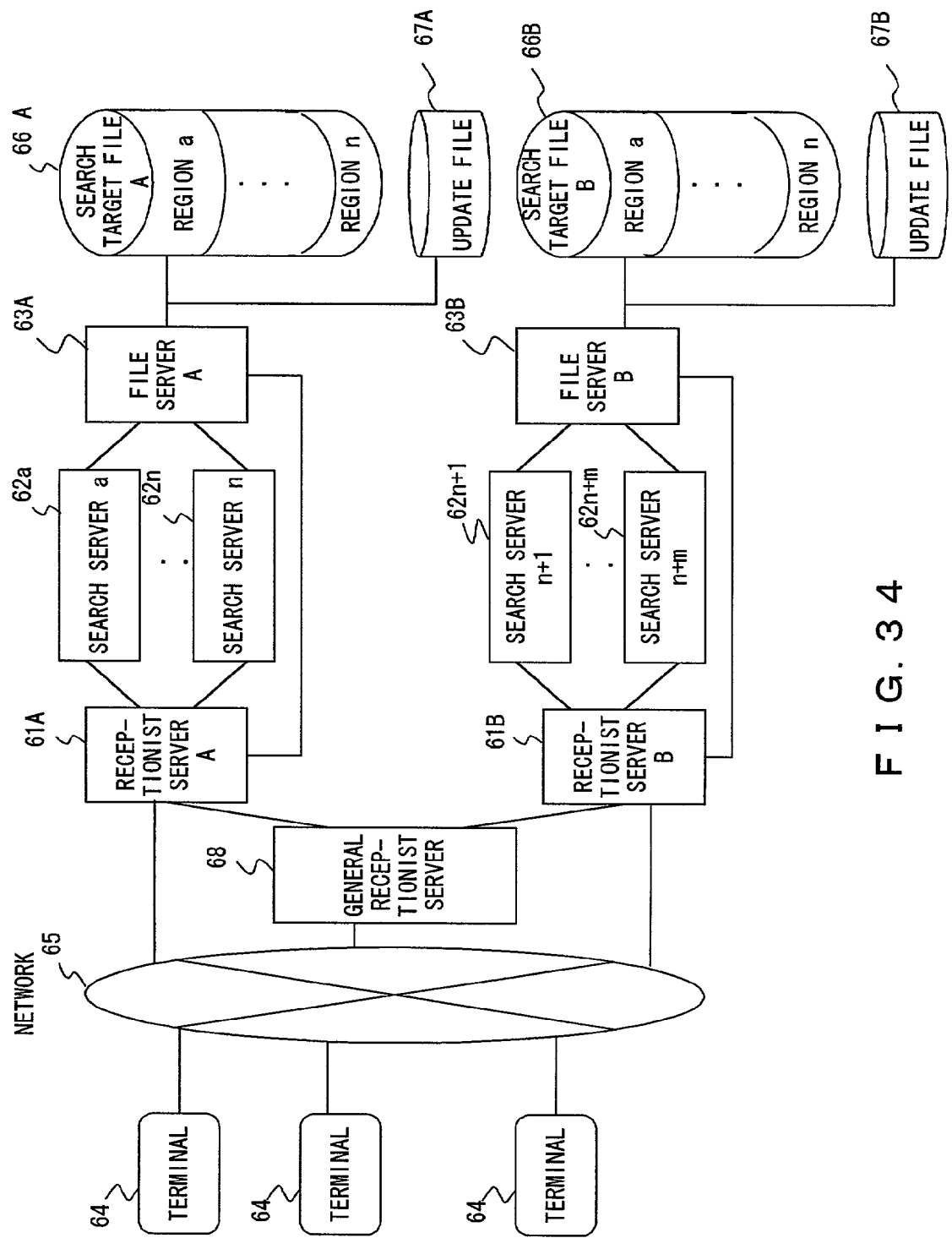
F I G. 34

| RECEPTIONIST SERVER NAME | ADDRESS | STATE FLAG |
|---|---|---|
| RECEPTIONIST SERVER a | 16.85.102.01 | 0 |
| RECEPTIONIST SERVER b | 22.36.155.02 | 0 |
| RECEPTIONIST SERVER c | 18.24.233.01 | 0 |
| RECEPTIONIST SERVER d | 34.26.111.01 | 1 |
| RECEPTIONIST SERVER e | 45.88.188.02 | 0 |

F I G. 3 7

| RECEPTIONIST SERVER NAME | PROCESSING RESULT FLAG | SEARCH RESULT |
|---|---|---|
| RECEPTIONIST SERVER a | | |
| RECEPTIONIST SERVER b | | |
| RECEPTIONIST SERVER c | | |
| RECEPTIONIST SERVER c | | |

F I G. 3 9

CONTESTS OF HIT RECORD

[K]<NAME>○○············, [K]<NAME>○○···

FIG. 41

| RECEPTIONIST SERVER NAME | PROCESSING RESULT FLAG | SEARCH RESULT |
|---|---|---|
| RECEPTIONIST SERVER a | 1 | [K]<NAME>○○○○ |
| RECEPTIONIST SERVER b | 1 | |
| RECEPTIONIST SERVER c | 2 | |
| RECEPTIONIST SERVER e | 1 | [K]<NAME>○○○○ |

FIG. 42

FULL TEXT SEARCH SYSTEM

BACKGROUND OF THE INVENTION

1. Field of the Invention

The present invention relates to a full text search system applying a character string collation method which searches a large quantity of data for a short time using a plurality of search processing apparatuses. What is called a character string collation method here stands for a method for examining whether a dedicated character string exists in the text data of search target while collating the dedicated character strings with the text data of search target one after another in the backward direction from the top of the text data of search target.

2. Description of the Related Art

Presented in Kokai (unexamined patent publication) No. 8-137734 titled "Information Processing System and Database Distribution Method" as prior art is a method of shortening a search time using a plurality of search processing apparatuses, wherein small-scale information processing devices such as a personal computer are connected with a personal computer LAN; data is distributed in such a way that a database for each information processing device can be almost even; the data is processed in parallel by each information processing device when the data is processed; and the processed results are integrated and displayed in one information processing device (hereinafter referred to as first prior art).

Also, there was a method of conducting search processing wherein search target data is divided into a plurality of fields; each divided field is allocated to each individual search processing apparatus; and the individual search processing apparatuses conduct search processing in parallel simultaneously. For example, presented in Kokai (unexamined patent publication) No. 9-134364 titled "Information Search System" is the following method of conducting search processing. The Information Search System comprises a plurality of search servers which perform search processing and a search management server which manages the operation of these search servers. The search management server is divided into a text base of search target (text type database), and relevant information about this text base is also divided. A combination of the divided portions of this test base and relevant information corresponding to the divided portions is allocated to part or the whole of a plurality of search servers. A plurality of search servers execute information search for the divided portion of the text base allocated by the search management server in parallel and independently. By constituting the System in such away, no special hardware is required even when a plurality of text bases are searched at the same time, and information search can be promptly done without being affected by the size of the text base of search target, thus making it possible to conduct search processing in parallel and simultaneously (hereinafter referred to as second prior art).

In the first prior art, when each divided database (when the database is divided) is made into an physically independent file for each search processing apparatus, a physical re-division of the search target data is needed if a problem of increase or decrease in the number of search processing apparatuses occurs due to an additional installation of search processing apparatuses and the breakdown of search processing apparatuses, and as a result the time duration during which the operation of the System is suspended becomes longer because of the work required for the physical re-division of the data of search target.

In the second prior art, the whole of the text type file must be rewritten when data is added or part of the data is changed, and if the file is a huge one, it takes a long time to rewrite the file. Consequently, the full text search system using the character string collation method in which search processing and data addition and update processing are carried out in parallel cannot be a practical method unless this problem of the time required for rewriting is solved. Furthermore, since a number of search processing apparatuses are used, there is a high possibility that any defect occurs to any of the search processing apparatuses.

SUMMARY OF THE INVENTION

The object of the present invention is to provide a full text search system wherein update (addition, change or deletion) of the search target data can be executed in parallel with search, and even if any defect occurs to any of the search processing apparatuses, degeneration operation which removes any search processing apparatus in which the defect has occurred can be conducted rapidly.

FIG. 1 shows the block diagram of the present invention. 1 in the figure shows the character string data of search target. It shows the character string data of search target for which search to be intrinsically conducted is carried out, and is a logical series of character string data stored in a magnetic disc device or a semiconductor memory device. This series of character string data is divided into records which can be identified by scanning and reading the character strings, and these character string records are gathered and stored as integrated information. Search is carried out in such a way that the character string information which constitutes the records can be collated based on search conditions, and a satisfactory character string record can be searched and outputted.

4 in the figure is a search processing apparatus, and it consists of a plurality of search processing apparatuses. The full text search system of the present invention executes search processing by distributing the search-target character string data 1 into a plurality of said search processing apparatuses. 2 in the figure is a search integration unit wherein the search-target character string data 1 is divided into a group of character string records, which are allocated to a plurality of search processing apparatuses 4, and given character string search conditions are transmitted as search instructions to each search processing apparatus 4, and then search results are received from each search processing apparatus and are integrated.

Usually, the contents of search-target character string data are not fixed, but update of the data are often required. In the present invention, when new records are added to the records of the search-target character string data 1 or said records are changed into new records, an update temporary storage unit 3 temporarily stores the new records to update the search-target character string data 1 so that update of such data can be executed simultaneously while search processing is being conducted. Therefore, when the data 1 is updated by the new records, the update temporary storage unit 3 can store the new records without changing the contents of the search-target character string data 1.

In order to target the new records for search processing, an update record search instruction unit 8 instructs the new character string records stored in the update temporary storage unit 3 as a part of the search-target character string data 1 to one of the search processing apparatuses 4 which has been determined in advance.

An update result reflection unit 5 deletes old records in the search-target character string data 1 corresponding to the new records stored in the update temporary storage unit 3 and incorporates the new records into the search-target character string data 1, so that reflection of the new records can be executed at any time.

When search processing is allotted to a plurality of search processing apparatuses 4, the search processing is shared and executed by said apparatuses by excluding any defective apparatus if any defect occurs to it. That is, the system of the present invention further comprises both a search result receiving time storage unit 6 which stores the time when said unit 6 receives the search results from the search processing apparatuses 4 to which the character string data 1 is divided and allocated after the search integration unit 2 transmits search instructions to a plurality of search processing apparatuses 4, and a breakdown search processing apparatus judgement unit 7 which judges any search processing apparatus 4 which does not receive search results within a preset time after the search processing apparatus 4 receives search results for the first time, as a defective apparatus.

Also, when the search processing apparatuses 4 which are instructed to search the data including the new records stored in the update temporary storage unit 3 have so many groups of records that the search time becomes too long, said apparatuses are once judged to be defective. In this case, however, the new records are incorporated in the search-target character string data 1 by the search result reflection unit 5, and then search processing is executed again.

Therefore, according to the present invention, the system which searches a large quantity of data which is composed of character string records for character string records satisfying the given conditions by using a character string collation method can update the large quantity data of search target in parallel even when search processing is being executed. The invention thus makes it easy to operate a search system which searches a large quantity of data, and makes it possible for a user to search up-to-date data which is updated moment by moment. As a result, quality improvement and reliability improvement of search data can be expected. Also, in the system of the present invention which improves the search speed by searching a large quantity of data using a number of search processing apparatuses at the same time, it is possible to change the allocation of search target data which is shared by each search processing apparatus for a short time so that even if any defect occurs to part of the search processing apparatuses, it is possible to operate the system without interrupting the search processing in the construction in which the number of the search processing apparatuses has reduced, thus causing reliability improvement and working-ratio improvement as an integrated search system to be realized.

BRIEF DESCRIPTION OF THE DRAWINGS

FIG. 1 shows the block diagram of the present invention.
FIG. 2 shows the overall concept of the full text search system.
FIG. 3 shows an example of search target data.
FIG. 4 shows an example of search request.
FIG. 5 shows an example of a search request window.
FIG. 6 shows an example of a search result window.
FIG. 8 shows the block diagram of the receptionist server.
FIG. 9 shows the block diagram of the search server.
FIG. 10 shows the overall flow of processing.
FIG. 13 shows an example of the environment table (1).
FIG. 14 shows an example of the responding table.
FIG. 15 shows an example of the allocation table of search server a (1).
FIG. 17 shows an example of search data.
FIG. 18 shows the block diagram of update processing.
FIG. 20 shows an example of the update file responding table.
FIG. 23 shows the search request buffer.
FIG. 24 shows an example of the search result table (1)
FIG. 26 shows an example of search results (1).
FIG. 27 shows an example of the search result table (2).
FIG. 31 shows an example of the environment table (2).
FIG. 32 shows the re-allocation of a search target region.
FIG. 33 shows an example of the allocation table of the search server a (2).
FIG. 34 shows the overall block diagram of the second embodiment.
FIG. 37 shows an example of the environment table G (1)
FIG. 39 shows an example of the search result table G (1).
FIG. 41 shows an example of search results (2).
FIG. 42 shows an example of the search result table G (2).

DESCRIPTION OF THE PREFERRED EMBODIMENTS

Figure 7:
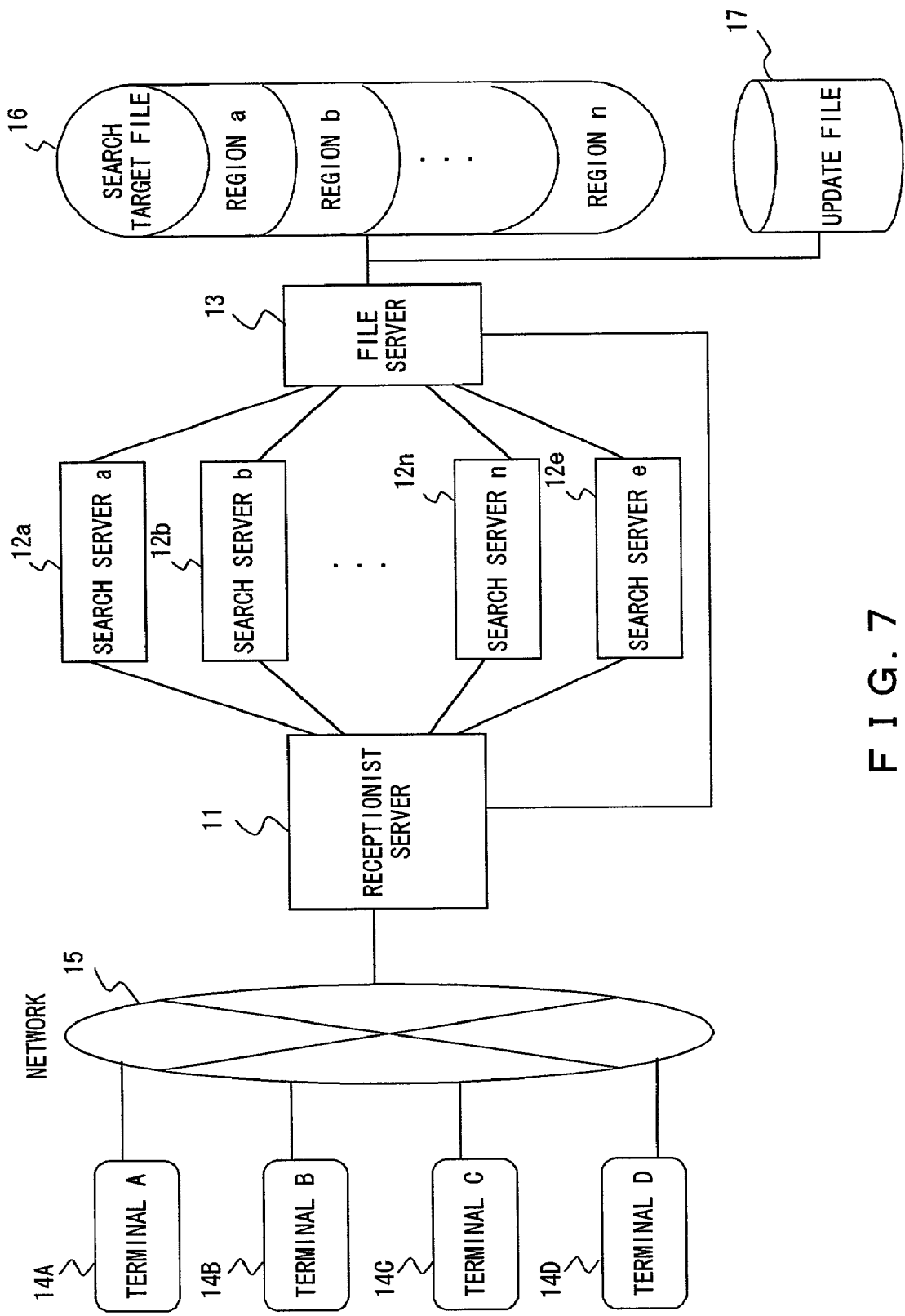
FIG. 7 shows the overall block diagram of the full text search system.

The present invention can be realized by a computer program which is executed on a computer used for versatile purposes such as a personal computer, a work station, etc., and such a mode is employed in the embodiment described below.

The full text search system of the present invention can be realized by a computer program on a computer which comprises a processing device, a main storage device, and an input-output device. The computer program related to the present invention is stored in a portable type storage medium such as a floppy disc and a CD-ROM, or in a main storage device or an auxiliary storage device of other computers connected via a network. Such a storage medium is also within the scope of the present invention.

The computer program provided is loaded onto the main storage device of the computer directly from a portable type storage medium. In the computer which is provided with an auxiliary storage device, the computer program is once copied or installed in the auxiliary storage device from the portable type storage medium, and then is loaded onto the main storage device and is executed. When said program which is stored in any other apparatus connected via a network is provided, said program is received from the other apparatus via a network, and then is loaded onto the main storage device. In the computer which is provided with an auxiliary storage device, said program is copied in the auxiliary memory, and then is loaded onto the main storage device and is executed.

FIG. 2 shows the overall concept of the full text search system of the present invention (hereinafter referred to as this System). In accordance with search requests which irregularly emerge from a plurality of terminals (terminal A, terminal B, and terminal C), this System extracts information which satisfies the search request from among search target data (which corresponds to search-target character string data 1 in FIG. 1), and returns the information as search results to each terminal. Also, this System can add new data to the search target data and change the search target data based on the addition and update request of data from a terminal (terminal D) in parallel with search processing.

First of all, an example of search target data is shown in FIG. 3. The example of search target data shown in FIG. 3 includes a lot of personal data which consists of name, alma mater, birthplace, and sex. The search target data consists of a plurality of records. A record consists of a plurality of items. The contents of an item are character strings. Please note that numerical values and date are also indicated by character strings. Records can be discriminated by a record punctuation mark ([R]). Items in a record are punctuated by an item punctuation mark ([K]) and can be unequivocally identified by an item identification mark (<character string>) (hereinafter referred to as tag). Record number (NO) which is the mark that can unequivocally identify a record is given to a record. Please also note that explanations given hereinafter are based on the premise that there is a large enough quantity of search target data in the embodiment of the present invention.

FIG. 4 shows an example of search request. FIG. 5 and FIG. 6 show examples of a search request window and a search result window respectively. In the example of search request of FIG. 4, search request has item tags, array of information as a pair of search words, and search condition formula. These pieces of information mean that designated search words exist in the item designated by item tags in the search target record and that the record which satisfies the search condition formula is expected to be searched.

This example shows a simple example wherein in the search of personnel information, name and alma mater are inputted as a search condition as shown in FIG. 5, and the personnel information which satisfies both of the conditions as relevant information is searched. Also, when known information such as only name or name and alma mater are inputted in the search request window, and satisfactory information is found, said information including relevant information is returned as shown in FIG. 6. In this way, search condition formula shown in the example of search request of FIG. 4 can be automatically created by a combination of inputted information.

As has already been described, this System finds a record which satisfies search request from among files, and returns part or the whole of the record to the person who made the search request such as the screen of a terminal. Since this System simultaneously executes search processing in parallel using a plurality of search processing apparatuses (which correspond to the search processing apparatus 4 shown in FIG. 1), search time can be reduced in proportion to the number of the search processing apparatuses.

Also, in this System, each divided region is not used as a physically independent file, but search target data is used as a physically independent file or as a logical series of file, and search target data is logically divided into the regions corresponding to the number of the search processing apparatuses for each record, and each region is allocated to different search processing apparatuses, then search is conducted. Therefore, even if increase or decrease in the number of the search processing apparatuses occurs, the processing can be continued promptly only by logically re-dividing the file into the number corresponding to that of the search processing apparatuses, and re-dividing each region into the search processing apparatuses.

The file type of this System is assumed to be a file in a text type in which character information is simply arrayed. However, since this description is based on the premise that there is a large enough quantity of search target data which the full text search system handles as the object of the present invention, if the search target data is gathered as one file, that file becomes a huge file.

In said text type file, when data is added or part of data is changed, the whole file must be re-written, and when the file is huge, it inevitably takes a long time to re-write the file. Therefore, the full text search system of the present invention using a character string collation method wherein search processing and data update processing are executed in parallel cannot be a practically usable system unless the problem of this processing time required for re-writing of the file is solved. Also, since this System uses a number of search processing apparatuses, there is a possibility that any of the search processing apparatuses gets defective. Therefore, when any defect occurs to any of the search processing apparatuses, it is necessary to promptly perform degeneration operation which removes the defective search processing apparatus.

FIG. 7 shows the overall block diagram of the first embodiment of the present invention. This System comprises one receptionist server 11, a plurality of search servers 12a to 12e, and one file server 13. The receptionist server 11 receives search request from terminals 14A to 14D via the network 15, and transfers it to the search servers 12a to 12e. The search servers 12a to 12e find the record which satisfies the search request from among the regions a to n of which the search target file 16 takes charge, and returns the results to the receptionist server 11.

Also, the receptionist server 11 additionally registers new data in the update file 17 based on the request for update of data in the search target file 16 from the terminals 14A to 14D. The file server 13 is an apparatus which reads or writes the data of the search target file 16 and the update file 17 based on the request from the receptionist server 11 or the search servers 12a to 12e. Since this apparatus is a general apparatus, detailed description about it is omitted in this embodiment.

Described next are details of the receptionist server 11. The constitution of the receptionist server 11 is as shown in FIG. 8. The receptionist server 11 comprises an information processing device 21, a magnetic file device 22, and a program storage device 23. The program storage device 23 comprises a control program 24, a director program 25 (which corresponds to the search integration unit 2 shown in FIG. 1), a data update program 26, a time monitoring program 27 (which corresponds to the search result receiving time memory unit 6 and the breakdown search processing apparatus judgement unit 7 shown in FIG. 1), search threads 28, an environment table 29, a responding table 30, a search request buffer 32, and a search result table 33.

The data update program 26 is the program which updates the records in the file in which the character strings of search target are stored. Update of the records is executed by the receptionist server which maintains and manages search targets.

The director program is the program of integrating divided searches, which distributes the character string data of search target to a plurality of search servers, transfers the search request received from the terminals to each search server, and integrates the search results returned from each search server and returns the integrated search results to the terminal which made the search request.

The time monitoring program 27, after requesting the search servers to execute search processing, monitors the response from the search servers and detects any abnormality of the search server which spends a much more response time than other search servers.

The search threads 28 successively send out the received search requests to the search servers in parallel.

The environment table 29, responding table 30, and update file responding table 31, details of which will be described later, are the tables which manage the distribution of search processing to the search servers.

The search request buffer 32 accumulates search requests from the terminals in the receptionist server in the state of waiting for processing, and transmits the search requests one after another to each search server as search instructions. The search result table 33 accumulates the results obtained when each search server has searched the search target data of each divided region, and when the results of all the search servers are gathered, the search results are integrated and then transmitted to the terminal which made the search request.

Described next are details of the search servers 12a to 12e shown in FIG. 7. The constitution of any of the search servers 12a to 12e is shown in FIG. 9. The search server comprises an information processing device 41, a magnetic file device 42, and a program storage device 43. The program storage device 43 comprises a control program 44, an initial setting program 45, a full text search program 46, an allocation table 47, and search data 48. Explanations are given hereafter by dividing the processing flow into four categories; pre-processing, update processing, search processing, and region re-allocation processing. The relationships of the four processing categories are shown in FIG. 10. The pre-processing is a process up to the processing prior to receiving search requests or data update requests after starting the system. The update processing additionally registers new data based on the request from the terminal. The search processing is the processing from receiving search requests from the terminal up to returning search results to the terminal. The region re-allocation processing re-allocates the search region to the search servers when the search processing irregularly terminates in the process of search processing.

Figure 11:
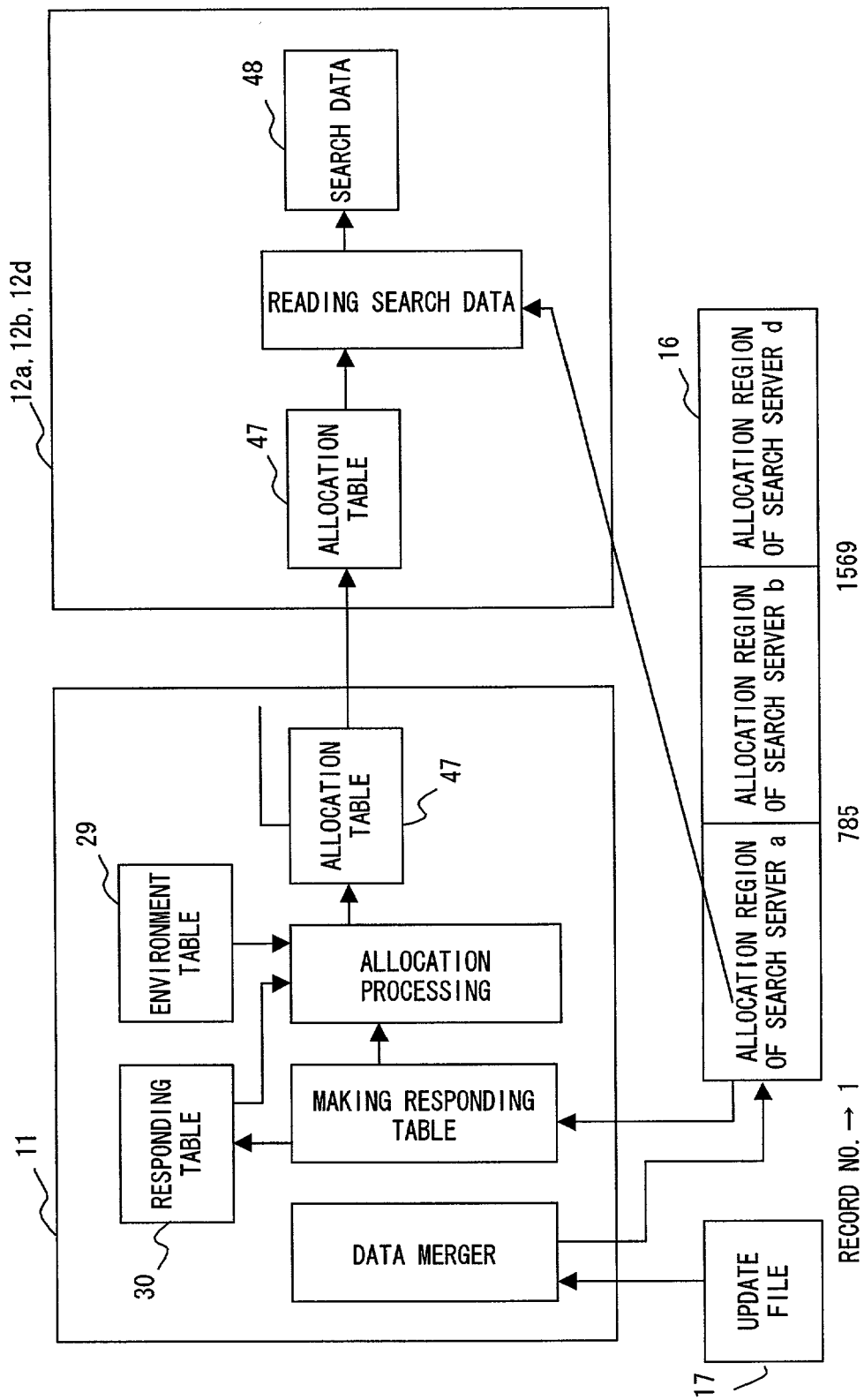
FIG. 11 shows the block diagram of pre-processing.

First of all, described below is the pre-processing. The relationship between the basic function of the pre-processing and the tables is shown in FIG. 11. Shown in FIG. 11 are only the tables and processing related to the operation of the pre-processing in the block diagram of the receptionist server 11 and the search server 12a, 12b, 12d shown in FIG. 8 and FIG. 9 respectively. Also shown in FIG. 11 are the allocated search region of each search server in the search target file 16 as well as the relationship with the update file 17.

The search target file 16 shown in FIG. 11 illustrates the state in which the search region is shared by three search servers; search server a (12a), search server b (12b), and search server d (12d). The illustration shows that each region is allocated for each unit of records; for example, the search server a shares record No. 1 to No. 784, and the search server b shares record No. 785 to No. 1568. The region is usually divided in such a way that the number of records, the length of character strings or the total sum of the size is almost equal in order to equalize the load. The update file 17 (which corresponds to the update temporary memory unit 3 shown in FIG. 1) stores new records as a separate file independent of the search target file 16.

Figure 12:
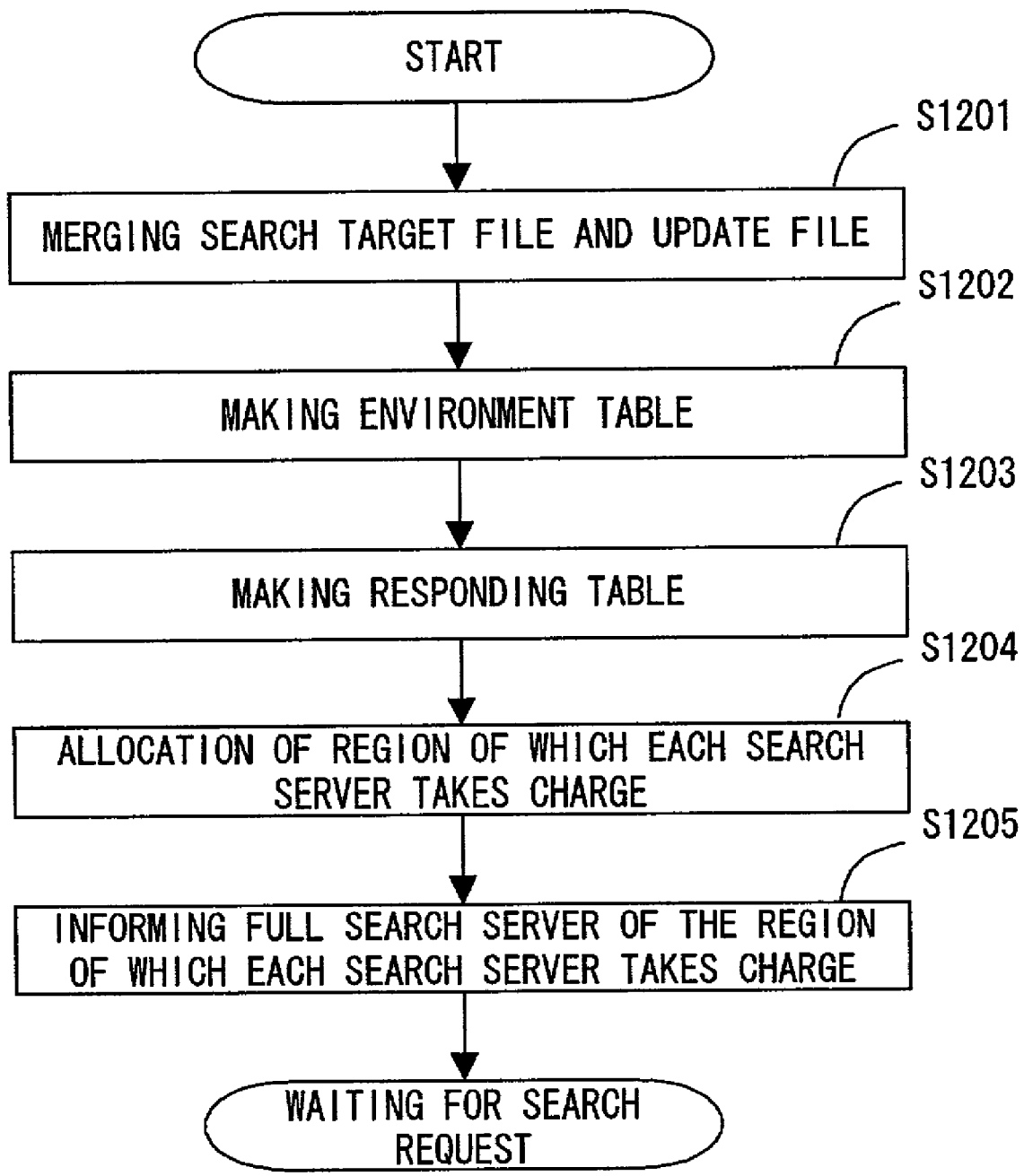
FIG. 12 is a flowchart of the director program (1)

Further described below are details of the processing flow of the receptionist server 11 and the search server 12 (12a, 12b, 12d) with reference to the contents shown in FIG. 11. First, the control program 24 of the receptionist server 11, after initializing the System, starts the director program 25. FIG. 12 shows the processing flow after the director program 25 is started.

The director program 25 merges the data in the update file 17 with the search target file 16 (which corresponds to the update result reflection unit 5 shown in FIG. 1) in Step S1201. Since the update file 17 temporarily stores new records to update the search target file 16, sometimes there is no content in the update file 17. However, since the records which were accumulated in the previous operation of the system are usually stored in the update file 17, the update file 17 is firstly merged with the search target file 16 when the system must be re-started for any reason like the beginning of search or the interruption of search.

When data of the same record number exists in the update file 17 and the search target file 16, the director program 25 replaces the data in the search target file 16 by the data in the update file 17. Since all the data in the update file 17 is integrated into the search target file 16 after these files have been merged, the director program 25 deletes all the data in the update file 17.

Next, the director program 25 makes the environment table 29 in Step S1202. The environment table 29 is a list of search servers as shown in FIG. 13, and it comprises search server name 29a, address 29b (network address), state flag 29c, flag in charge of update file 29d. The state flag 29c shows the state of the search server used. For instance, when the search server is in a unusable state, the director program 25 inputs "1" into the state flag 29c, and when the search server is in a usable state, the director program 25 inputs "0". The flag in charge of update file 29d shows that it is the search server in charge of searching the update file. Information other than the flag in charge of update file 29d is stored in the magnetic file device in advance, and the director program 25 obtains information from the magnetic file device and sets the environment table 29.

Next, the director program 25 reads the search target file 16 and makes the responding table 30 in Step S1203. The responding table 30 is a list of all the records in the search target file 16 as shown in FIG. 14, and it composes record No. 30a, top address 30b on the file of that record, and length 30c of that record.

Next, the director program 25 makes an allocation program 47 for each search server based on the environment table 29 and the responding table 30 in Step S1204. The allocation table 47 is a table in which the search region to be covered by each search server is allocated to each search server as shown in FIG. 15, and is made for all the search servers but one in which the state flag in the environment table (shown in FIG. 13) is in a usable state. Also, the director program 25 inputs ON "1" into the flag in charge of update file 29s (which corresponds to the update record search instruction unit 8 shown in FIG. 1) if the remaining search server in the environment table (FIG. 13). The allocation table 47 is a list of records in which each search server takes charge of search, and comprises record No. 47*a*, top address of the address 47*b*, and length of the record 47*c*. The director program 25 allocates the record of which each search server takes charge in the order from the top of the responding table 47 while watching the responding table 39 (FIG. 14) so that the total sum of the number of records or of the length of records in each allocation table 47 may be equalized.

The director program 25 informs the search server corresponding to each allocation table of the allocation table 47 (FIG. 15) together with the name of the search target file in Step S1205. Also, the director program 25 informs the search server in which the flag in charge of update file 29*d* in the environment table 29 is in a state of ON "1" of the allocation table 47 which is vacant together with the name of the update file, and then waits for search request. Described so far is the operation of the pre-processing of the receptionist server in accordance with the processing flow of the director program 25 in the receptionist server shown in FIG. 12.

Described next is the operation of the pre-processing in the search server 12. First, the control program 44 in the search server initializes the system, and then starts the initially set program 45 and the full text search program 46.

Figure 16:
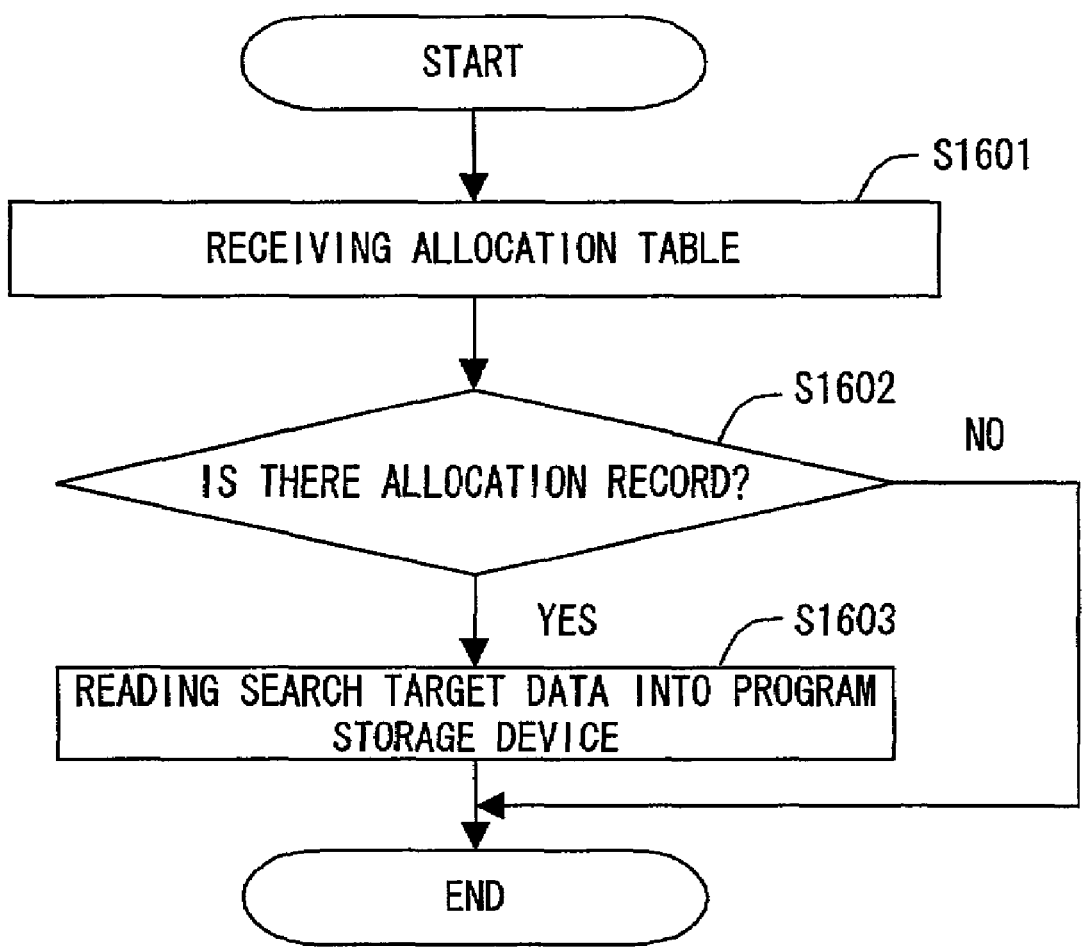
FIG. 16 is a flowchart of an initially set program of the search server.

The flowchart of the initially set program 45 of the search server 12 after having been started is shown in FIG. 16. The initially set program 45 receives the allocation table 47 from the receptionist server 11 in Step S1601, and when there is any allocation record in the allocation table 47 in Step S1602, the initially set program 45 reads the records of all the record numbers in the program storage device from the search target file in Step S1603 and makes the search data 48 (FIG. 17).

When there is no allocation record in the allocation table 47, the initially set program 45 stops working without doing anything because the search server in charge of the update file exists. Then, the full text search program 40, after having been started, waits for search request.

Described in succession to the explanations of the pre-processing is the update processing shown in FIG. 10. The relationship between the basic function and the table of the update processing is shown in FIG. 18. Details of the processing flow of the receptionist server 11 in the update processing are given below with reference to FIG. 18.

Figure 19:
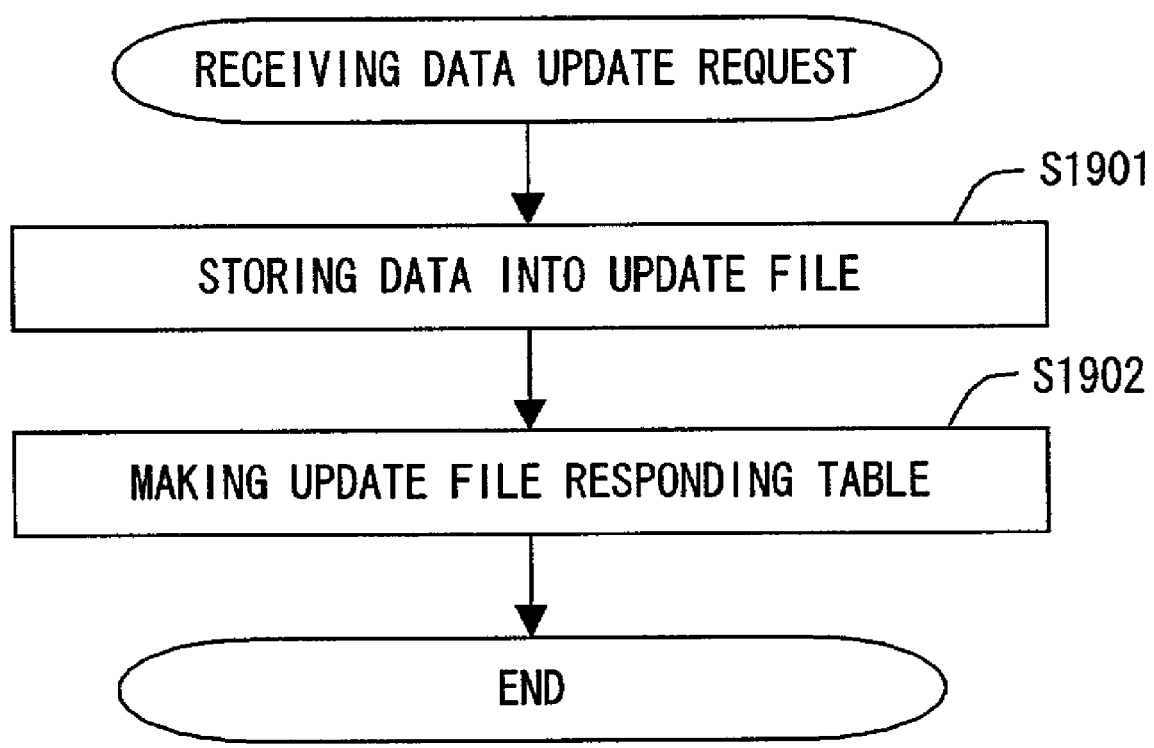
FIG. 19 is a flowchart of the data update program.

The control program 24 in the receptionist server 11, after initializing the System, starts the director program 25 and the data update program. The processing flow of the data update program 26 after having been started is shown in FIG. 19.

The data update program 26, after having been started, initializes the program, and then waits for data update request. After the data update program 26 receives data update request, if the data received is new additional registration data, record No. of the maximum record No. +1 which previously existed in the search target file and the update file is given to the new data, and is stored in the last portion of the update file 17 in Step S1901. If data having the same record No. as that of the data received exists in the update file 17, the data update program 26 deletes the data which exists in the update file 17. After registering the data in the update file 17, the data update program 26 makes the update file responding table 31 (FIG. 20), and waits for data update request again.

Figure 21:
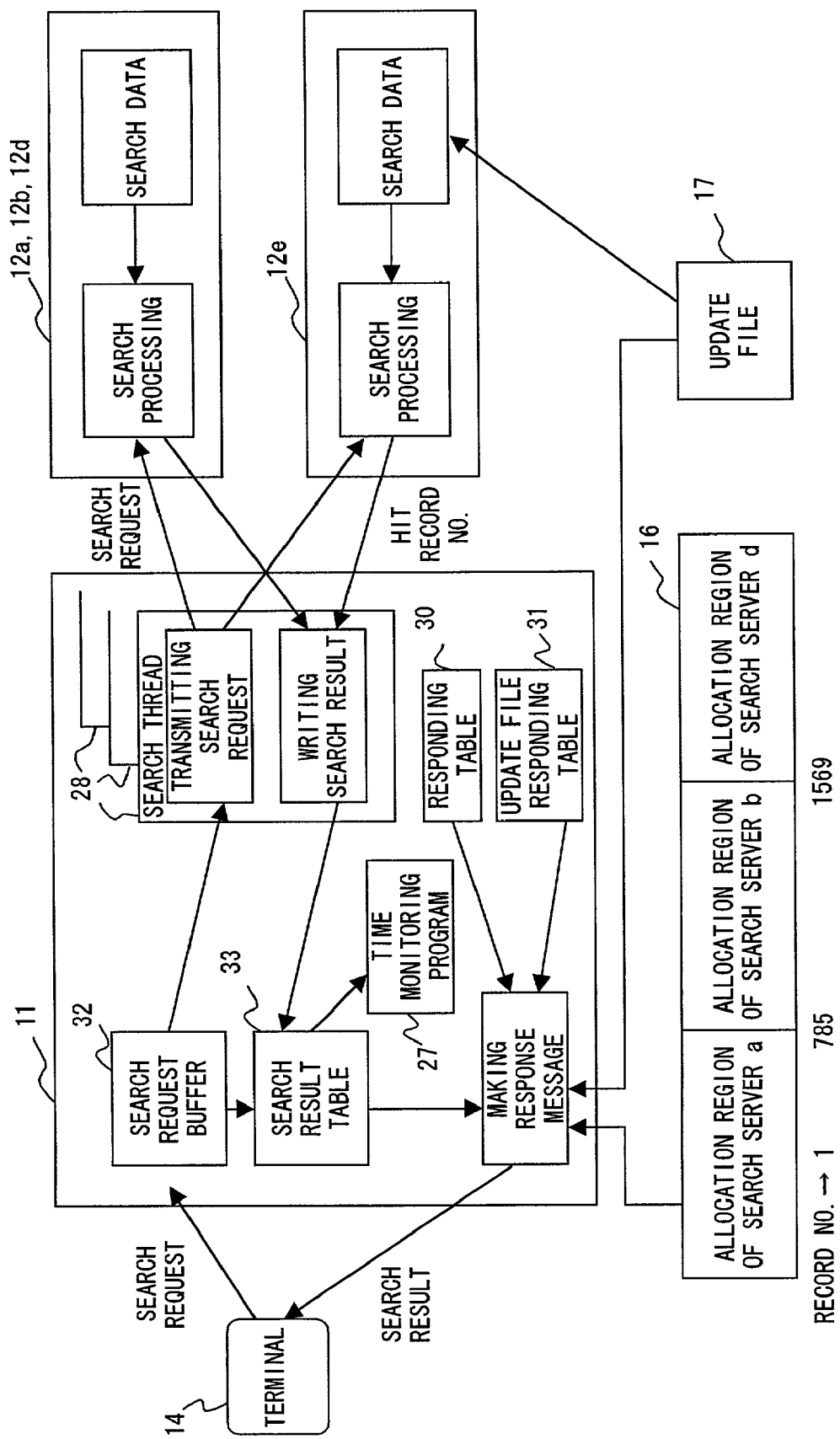
FIG. 21 shows the block diagram of search processing.

Described next is the search processing in the overall processing flow shown in FIG. 10. The relationship between the basic function and the tables of the search processing is shown in FIG. 21. Details of the processing flow of the receptionist server 11 and the search server 12 in search processing are explained below with reference to FIG. 21. As shown in FIG. 21, when the receptionist server receives search request from the terminal 14, the record of each allocated region in the search target file 16 makes the search servers a (12*a*), b (12*b*), and d (12*d*) take charge of search, and the record of the update file 17 makes the search server e (12*e*) take charge of search according to the setting done by the director program 25 in the pre-processing, and then search request is transmitted to each search server.

Figure 22:
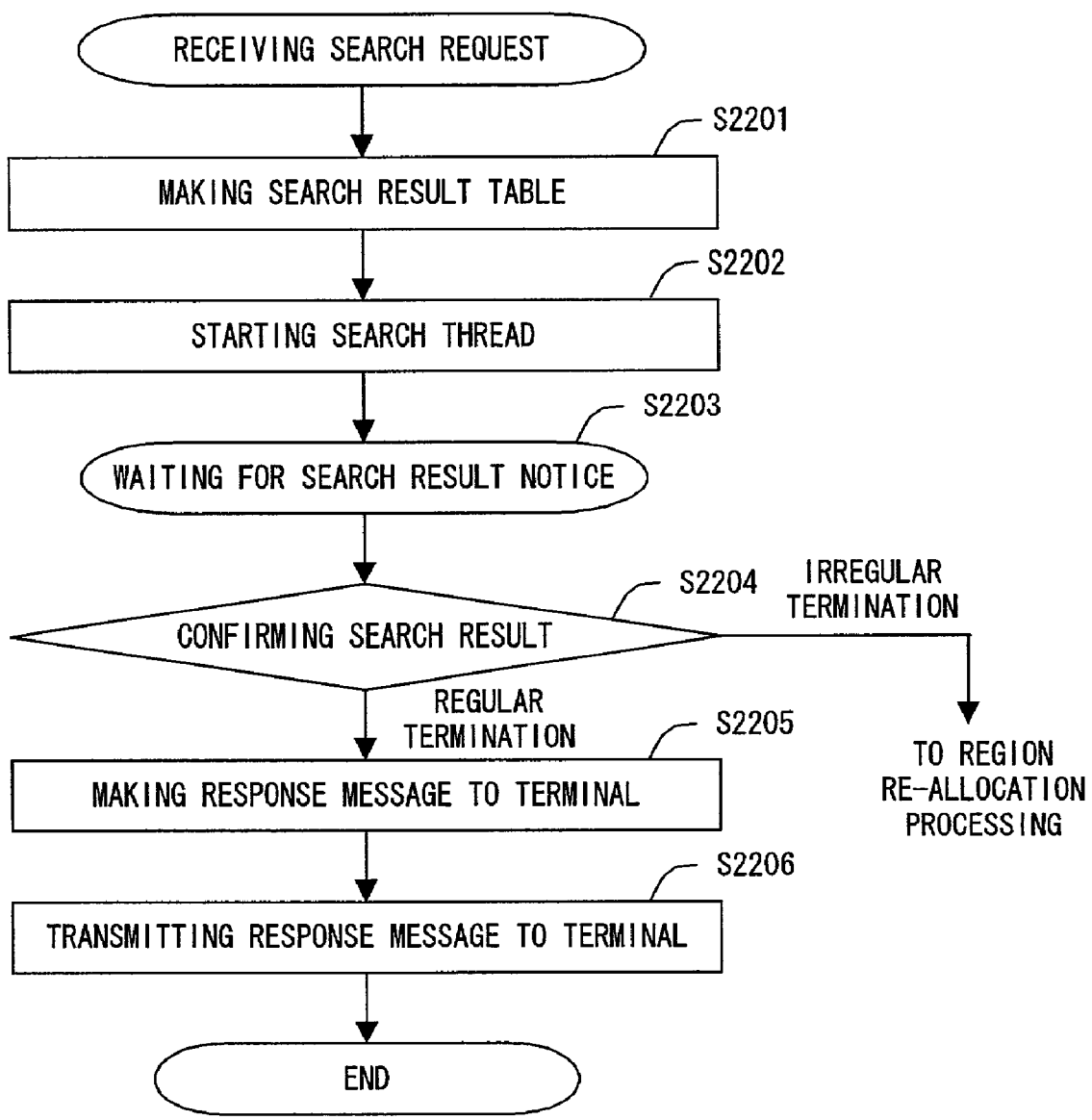
FIG. 22 is a flowchart of the director program (2).

When the director program 25 finishes the pre-processing at the end of the processing flow shown in FIG. 12, said program waits for search request. The flow of the subsequent processing of the director program 25 is shown in FIG. 22.

Search request from the terminal 14 is stored in the search request buffer 32 (FIG. 23). When search request comes from the terminal 14, the director program 25 takes out the search request from the search request buffer 32, and makes the search result table 33 (FIG. 24) for each search request in Step S2201. A list of names of the search servers in a usable state in the environment table 29 (FIG. 13) is made in the search result table 33, the flag in charge of update file 29*d* (33*a*) is posted in the search result table 33, and the columns for the processing result flag 33*b*, the processing termination time 33*c*, and the hit record No. 33*d* are provided.

Then, the director program 25 starts the search threads 28 corresponding to the search servers in a usable state in Step S2202. Upon starting the search threads 28, the director program 25 informs the search threads 28 of search request (FIG. 4), the address of the search server in charge of the search request in the environment table 29 (FIG. 13), and the column in which the director program 25 writes a response in the search result table 33 (FIG. 24). The search threads 28 are made by the same number as that of the search servers in a usable state for each search request. After starting the search threads 28, the director program 25 waits for a search result notice in Step S2203. The subsequent processing will be explained later.

Figure 25:
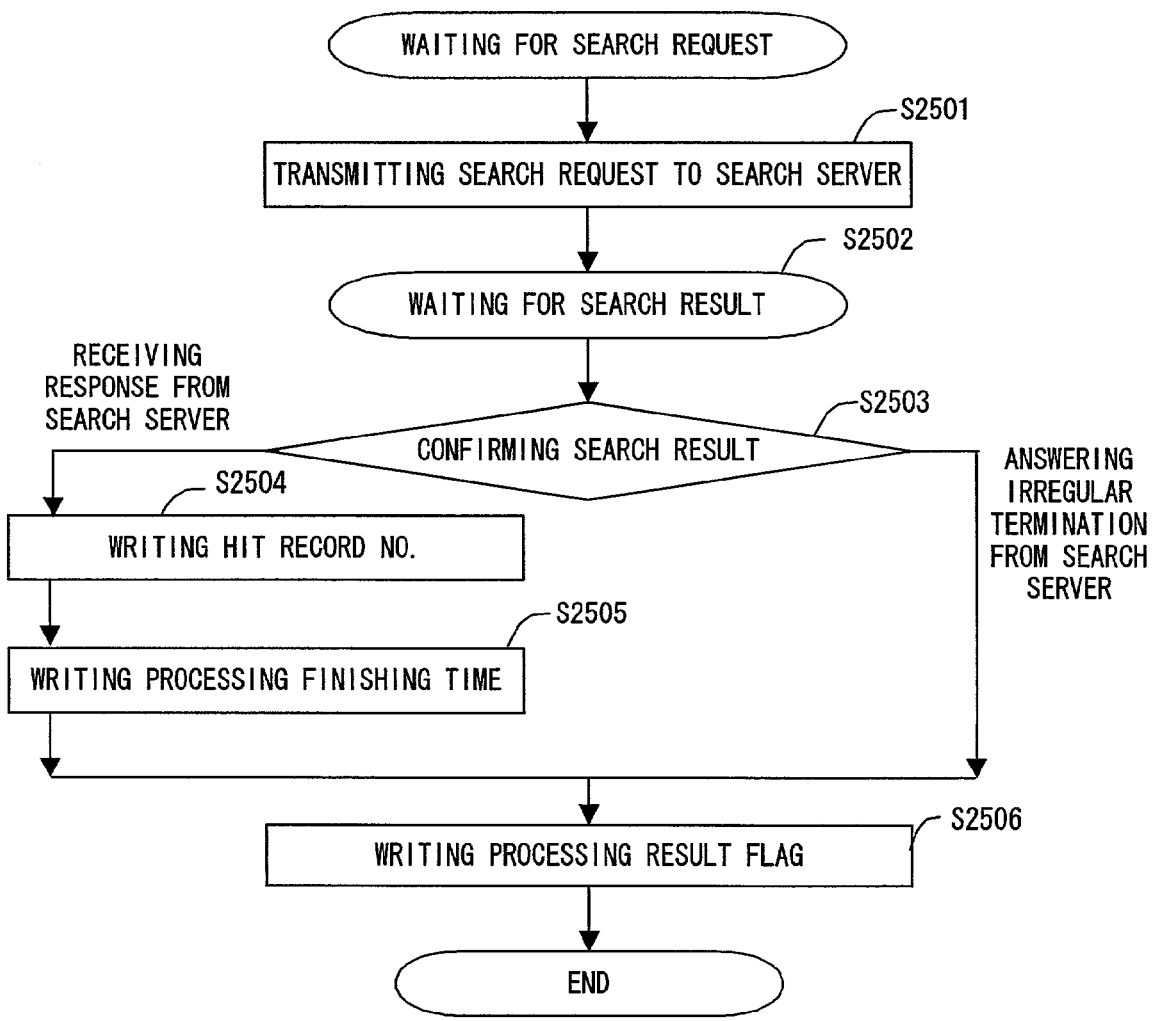
FIG. 25 is a flowchart of the search thread.

The processing flow of search thread 28 is shown in FIG. 25. The search thread 28, after having been started, receives search request, and informs the full text search program 46 of the search server of which the search thread takes charge of the search request in Step S2501. The search thread 28 waits for the search result in Step S2502, and confirms the search result in Step S2503, receives the hit record No. (FIG. 26) as a response of the search result from the search server, and then writes the response in the column of hit record No. 33*d* in the search result table 33 (FIG. 27) in Step S2504, and also writes that time received in the processing termination time column 33*c* in Step S2505 and sets the processing result flag 33*b* to the regular termination state "1" in step S2506. If an irregular termination response comes from the search server, irregular state "2" is set to the processing result flag column in Step S2506.

Figure 26:
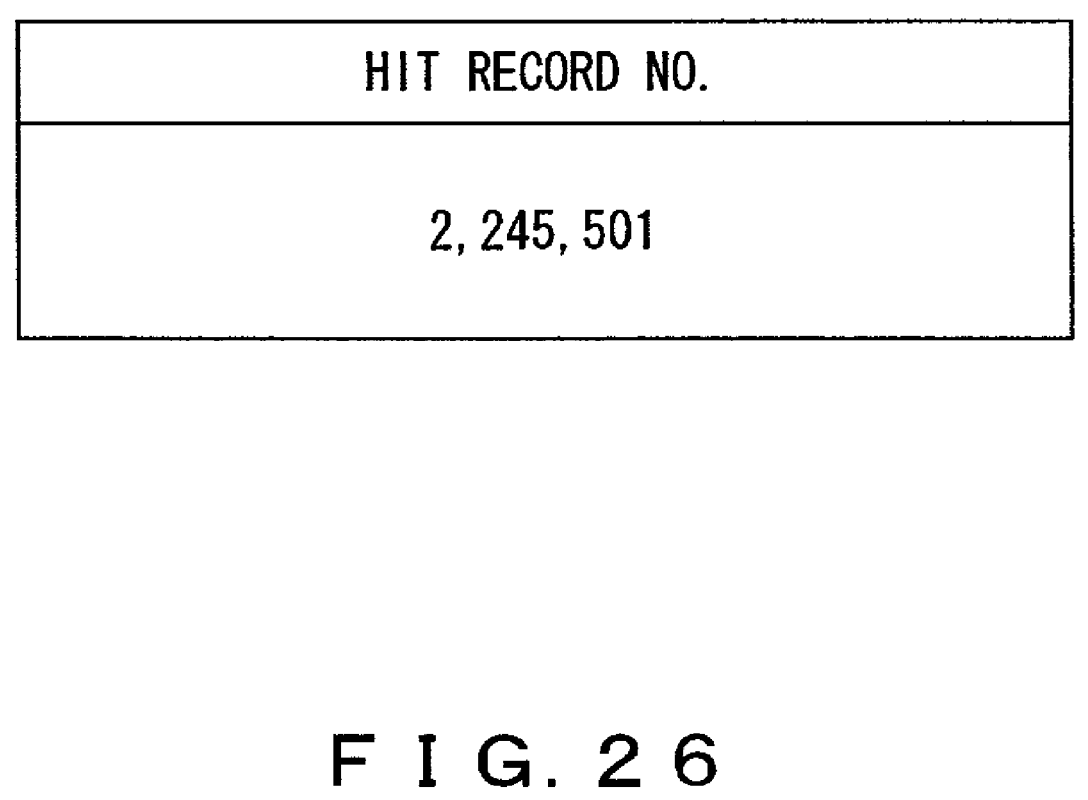
Figure 28:
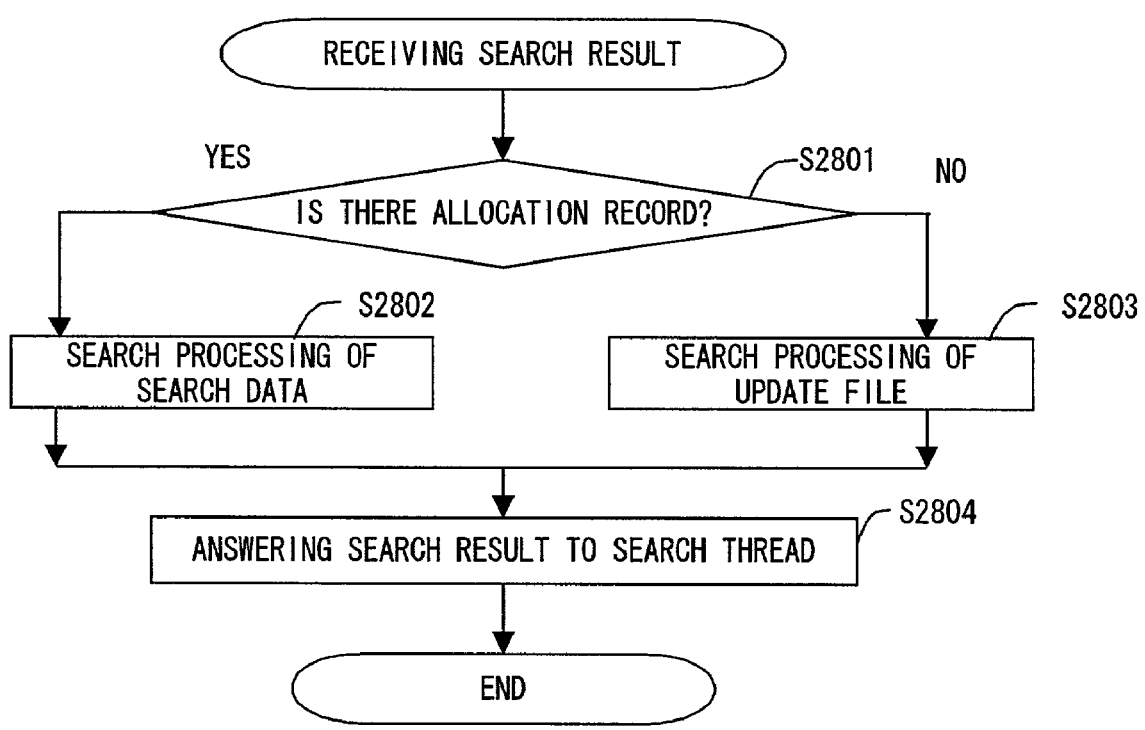
FIG. 28 is a flowchart of the full text search program.

Next, the processing flow of the full text search program 46 after the search request has been received from the search thread 28 is shown in FIG. 28. The full text search program 46 finds out the record which satisfies the received search request from among the search data 48 (FIG. 17) in the program storage device in Step S2802 when there is a record in the allocation table 47 (FIG. 15) in Step S2801, and finds out the record from the update file 17 in Step S2803 when there is no record in the allocation table 47. Then, the full text search program 46 returns record No. of the record found in Step S2804 to the search thread which receives search request as a hit record No. (FIG. 26). If any abnormality is detected in the process of search, a message of irregular termination is returned to the search thread which has received the search request.

Figure 29:
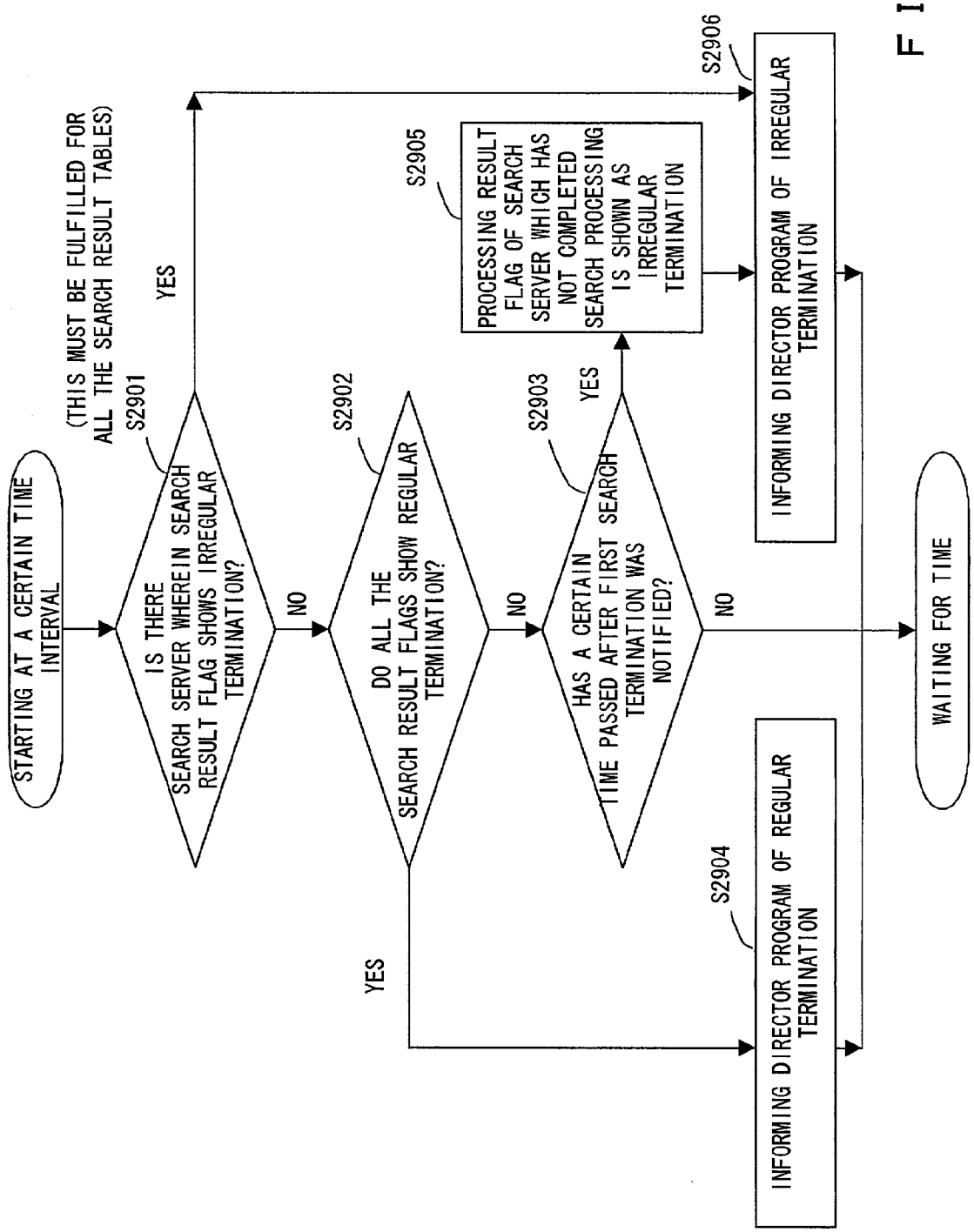
FIG. 29 is a flowchart of the processing of the time monitoring program.

The processing flow of the time monitoring program 27 is shown in FIG. 29. The time monitoring program 27 begins the processing at a regular time interval. After beginning the processing, said program executes the following processing for all the search result tables 33 (FIG. 27).

When there is any search server wherein the processing result flag 33b shows an irregular termination "2" in Step S2901, the time monitoring program 27 informs the director program of the irregular termination as a processing result notice in Step S2906. When all the processing result flags 33b shows a regular termination "2" in Step S2901, the time monitoring program 27 informs the director program of the regular termination as a processing result notice in Step S2904. If there is any search server wherein nothing has been inputted yet in the processing result flag 33b, or if there is any search server which has not finished the processing yet, the time monitoring program 27 checks whether a certain time has passed from the earliest time of the processing finishing time of the search server other than the one in charge of the update file in Step S2904, and if yes, the time monitoring program 27 sets the processing result flag 33b wherein nothing has been inputted yet and in the search result table 33 (FIG. 27) of the search server other than that of the update file to an irregular termination "2" in Step S2905, and then informs the director program of the irregular termination as a processing result notice in Step S2906.

Back to FIG. 22. After starting the search thread 28, the director program 25 receives a processing result notice from the time monitoring program 27 in Step S2204.

If the content of the processing result notice is a regular termination, the following processing is executed in Step S2205. For the search server wherein the flag 33a in charge of update file is OFF, i.e. "0," the top address 30b and record length 30c of the record corresponding to the record No. 30a described in the hit record No. are taken out, and the content of the record corresponding to them is read in from the search target file 16. For the search server wherein the flag 29d in charge of update file is ON, i.e. "1," the top address and the record length of the record corresponding to the record No. described in the hit record No. are taken out from the update file responding table 31 (FIG. 20), and the content of the record corresponding to them is read in from the update file 17. However, when there is data of the same record No. in the responding table 30 (FIG. 14) and the update file responding table 30 (FIG. 20), the data of the record No. in the responding table 30 (FIG. 14) is neglected. Finally, the content of the record which has been read in in Step S2206 is edited in a given form and transmitted to the terminal, and the search request data of said terminal in the search request buffer is deleted.

Figure 30:
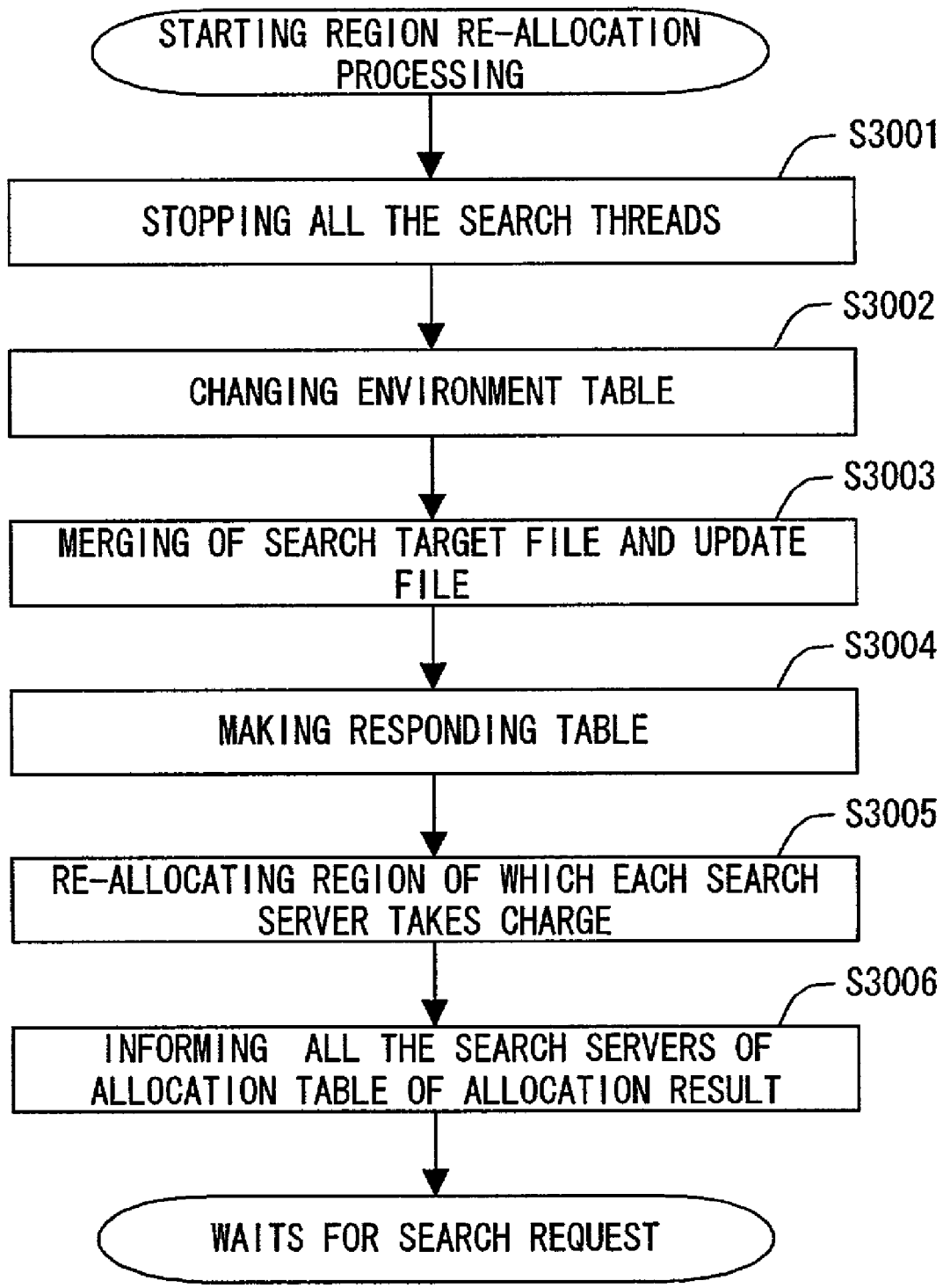
FIG. 30 is a flowchart of the director program (3).

When the content of the processing result notice is an irregular termination in Step S2204, the director program executes region re-allocation. The flow of the region re-allocation processing of the director program is shown in FIG. 30. In the region re-allocation processing, first, all the search threads are stopped in Step S3001. Then, for the search sever wherein the processing result flag 33b in the search result table 33 (FIG. 27) shows an irregular termination "2" in Step S3002, the state flag 29c in the environment table 29 (FIG. 31) is changed to an unusable state "1," and then all the search result tables 33 are deleted.

Next, the director program merges data in the update file 17 with the search target file 16 in Step S3003. If data of the same record No. exists in the update file 17 and the search target file 16, the director program replaces the data of the search target file 16 by the data of the update file 17. After this merger processing, the director program deletes the data of the update file 17.

After that, the director program re-creates the responding table 30 (FIG. 14) in Step S3004.

Next, the search target region of which each search server takes charge is re-allocated using the responding table 30 (FIG. 14) and the environment table 29 (FIG. 31) in Step S3005 as shown in FIG. 32. For instance, when the search server d is found to be unusable as shown in FIG. 31, the director program re-allocates the search target file 16 which has been allocated to the three search servers a, b, and d excluding the search server e which takes charge of the update file 17 to the two search servers a and b as shown in FIG. 32. The director program informs all the search servers of the allocation table 47 (the form of the allocation table is shown in FIG. 33) of said allocation results in Step S3006.

The initialization setting program 45 of the search server receives the notice, and executes the same processing as the pre-processing (FIG. 16).

After said processing has been executed, the director program 25 takes out the search request in the sear request buffer 32 and begins the search processing (FIG. 22) again. So much for the first embodiment.

Described next is the second embodiment. In the case of the first embodiment, the number of the receptionist server and the search target file is one each. In the case of the second embodiment, a plurality of receptionist servers and search target files exist as a pair of the receptionist server and the search target file. Compared with a plurality of systems of the first embodiment which dispersedly exist locally, the second embodiment is effective when the terminal which makes search request wants to make an intersectional search request.

The overall block diagram of the second embodiment is shown in FIG. 34. When there are a plurality (two in FIG. 34) of search target files 66A and 66B, the same system as that of the first embodiment for the respective search target files 66A and 66B is made. Accordingly, a plurality (two in FIG. 34) of receptionist servers 61A and 61B are made. One general receptionist server 68 is provided between these receptionist servers 61A and 61B and the terminals 64. Each terminal 64 asks the general receptionist server 68 for search and receives search results from the general receptionist server 68. In such a case as this, since the update and maintenance processing of the search target files 66A and 66B is executed for each server which manages said files, the data update request from the terminals 64 accessed via the general receptionist server 68 is generally not permitted, so the general receptionist server 68 is supposed not to accept the data update request from the terminals 64.

Figure 35:
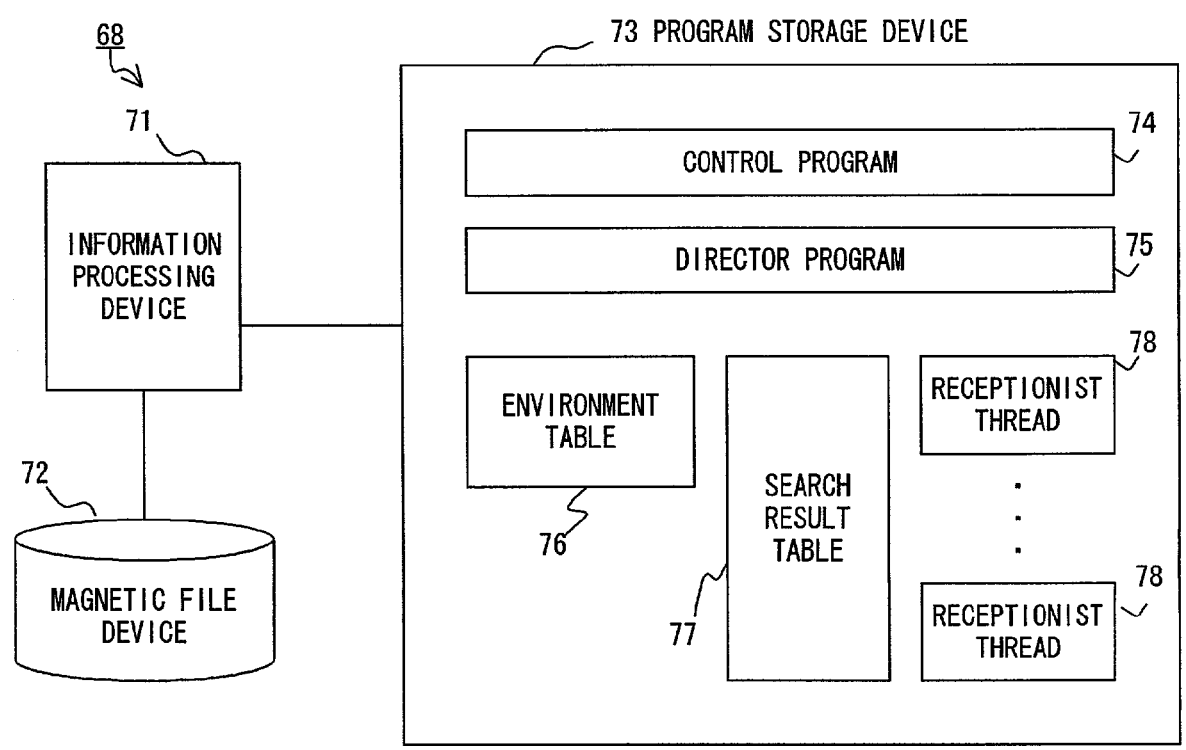
FIG. 35 shows the block diagram of the general receptionist server.

Since all the other functions than the general receptionist server 68 are the same as those of the first embodiment, only the general receptionist server 68 is described below. The block diagram of the general receptionist server is shown in FIG. 35. The general receptionist server 68 comprises an information processing device 71, a magnetic file device 72, and a program storage 73. The program storage device 73 comprises a control program device 74, a director program 75, an environment table 76, a search result table 77, and receptionist threads 78.

Figure 36:
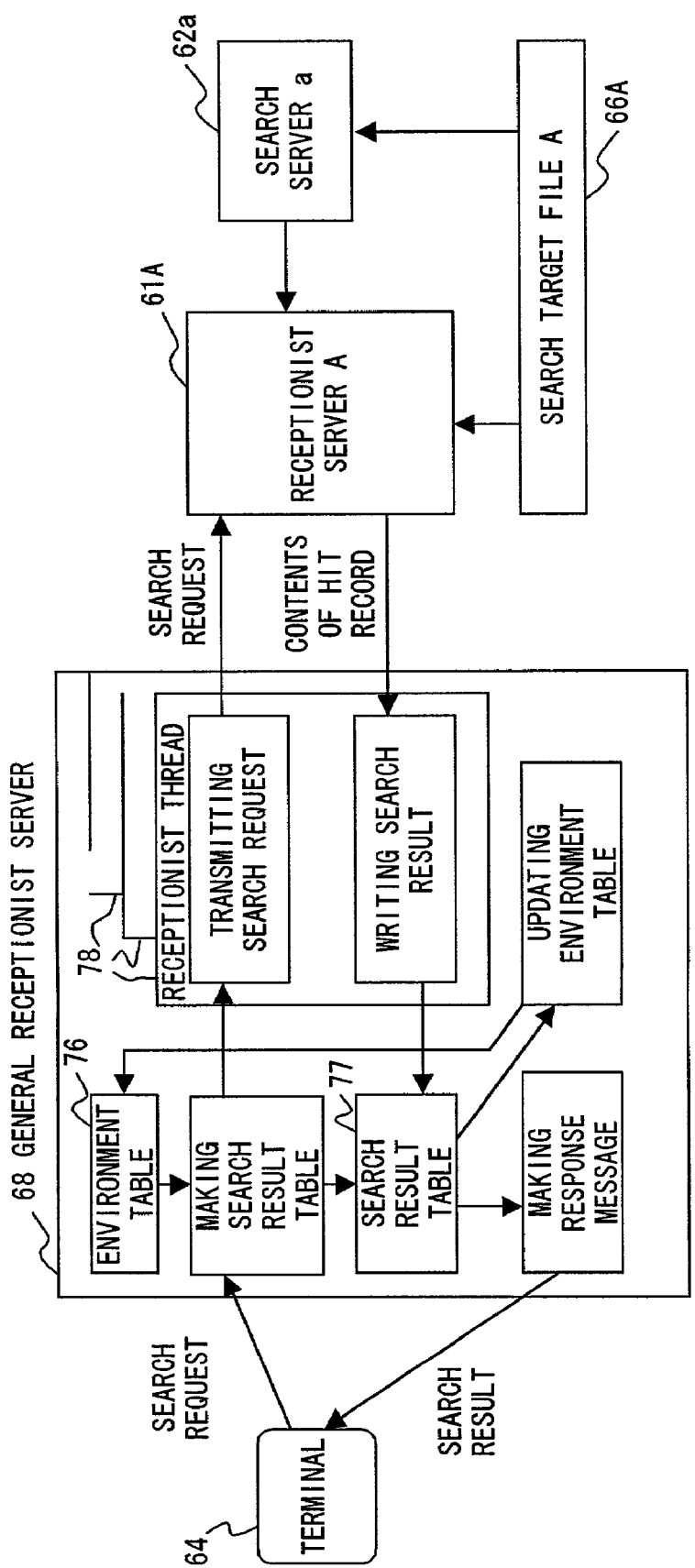
FIG. 36 shows the block diagram of the processing of the second embodiment.

The relationship between the basic function and the tables of the second embodiment is shown in FIG. 36. Described in detain below is the processing flow of the general receptionist server 68 with reference to FIG. 36. First, the control program 74 initializes the system, and then starts the director program 75.

The director program 75, after having been started, makes the environment table 76 (FIG. 37), and then waits for search request. The environment table 76 is a list of receptionist servers (in this example case, five receptionist servers), and comprises receptionist server name 76a and address 76b. State flag 76c shows the state of the receptionist server. For instance, when the receptionist server is in an unusable state, the state flag is set to "1," and when the receptionist server is in a usable state, the state flag to is set "0." These pieces of information are stored in the magnetic file device 72 in advance, and the director program 75 obtains the information from said device.

Figure 38:
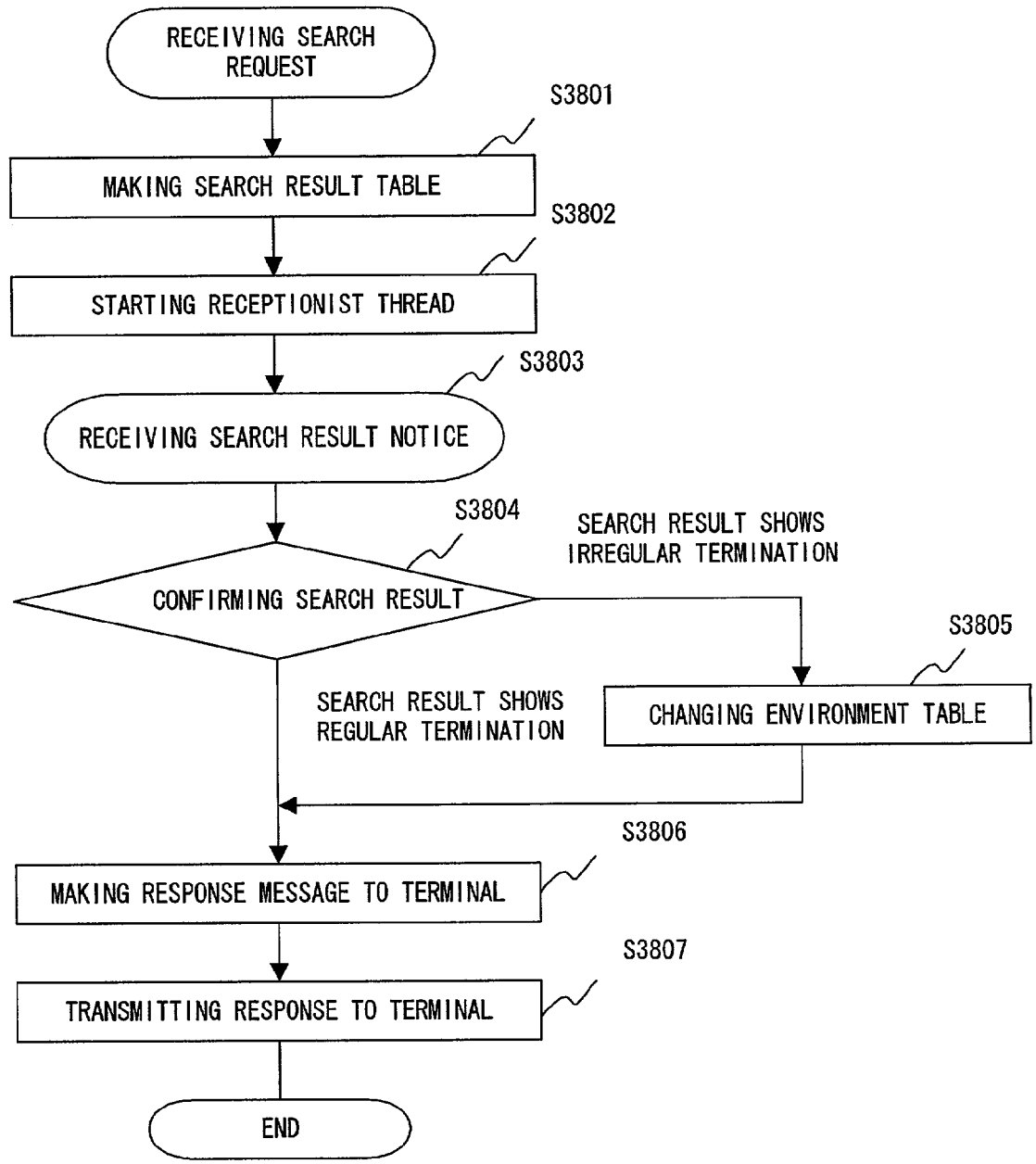
FIG. 38 is a flowchart of the director program of the general receptionist server (2).

The processing flow of the director program 75 after having received search request is shown in FIG. 38. The director program 75, after having received search request, makes the search result table 77 (FIG. 39) based on the environment table in Step S3801. The search result table 77 is a list of the receptionist servers which are in a usable state, and has the columns for the receptionist server 77a, the processing result flag 777b, and the search result 77c.

Next, the director program 75 starts the receptionist threads 78 corresponding to all the receptionist servers which are in a usable state in Step S3802. At the moment the receptionist threads are started, the director program informs the receptionist threads of the search request, the address of the receptionist server of which each receptionist thread takes charge, and the column in the search result table in which each receptionist thread writes its response. The receptionist threads 78 are made for each search request by the number of the receptionist servers which are in a usable state. The director program 75, after starting the receptionist threads 78, waits for a search result notice in Step S3803, and the subsequent processing will be described later.

Figure 40:
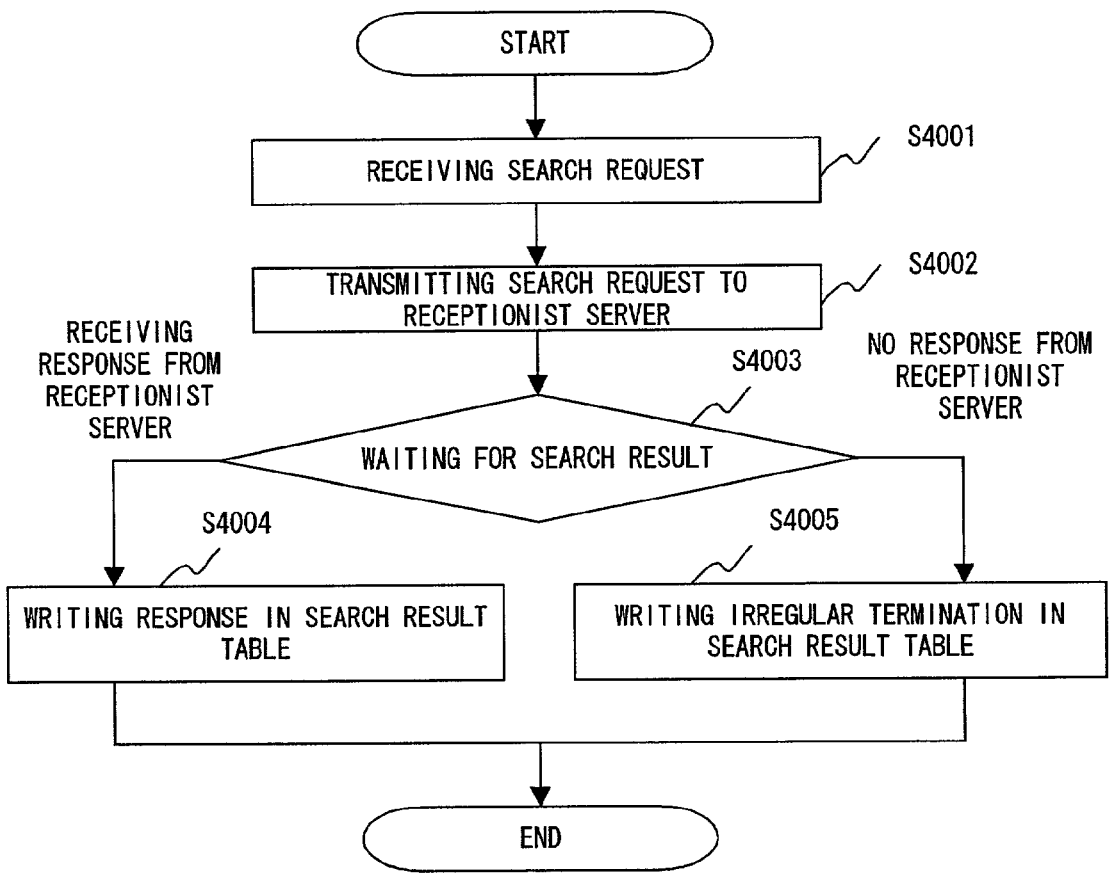
FIG. 40 is a flowchart of the receptionist thread.
Figure 41:
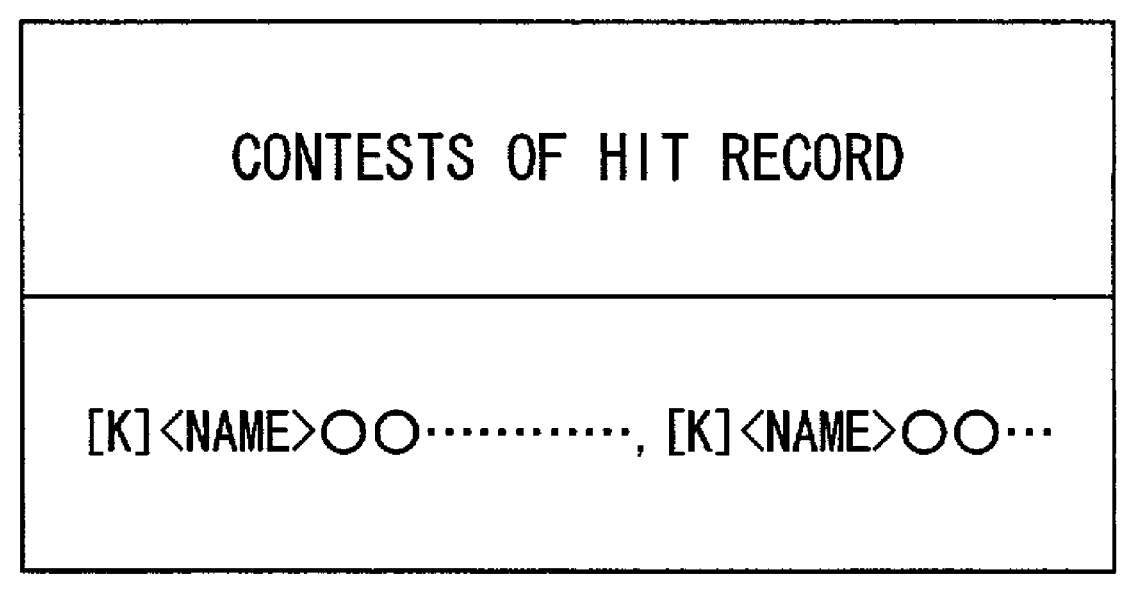

The processing flow of the receptionist thread 78 is shown in FIG. 40. After having been started, the receptionist thread 78 receives search request in Step S4001, and transmits it to the receptionist server of which the receptionist thread 78 takes charge in Step S4002. When receiving the search result (FIG. 41) in Step S4003, the receptionist thread 78 writes the search result in the search result column in the search result table 77 (FIG. 42), and sets the processing result flag 77b to a regular termination (e.g. "1") in Step S4004. If there is no response from the receptionist server within a certain time in Step S4003, the receptionist thread 78 judges that any abnormality has occurred to the receptionist server, and sets the processing result flag column 77b to an irregular termination (e.g. "2") in Step S4005.

Figure 43:
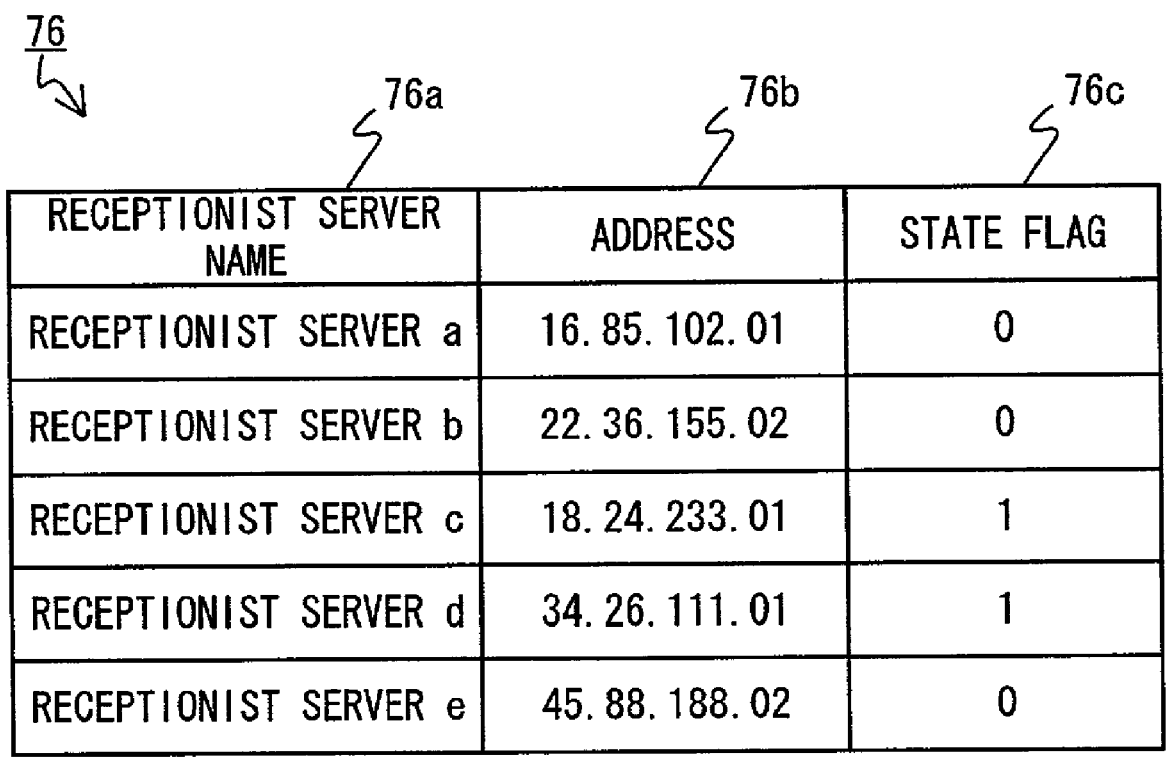
FIG. 43 shows an example of the environment table G (2).

Back to FIG. 38. After having started the receptionist thread 78, the director program 75 manages the state of waiting for the processing termination of all the receptionist threads for each search request. When the processing has terminated in Step S3804, the director program 75 confirms the processing result flag 77b in the search result table 77 (FIG. 43). Then, the director program 75 edits the search result of the receptionist server wherein all the search results are regular in a given form in Step S3806 and transmits the edited search result to the terminal in Step S3807.

If as the result of the processing result flag 77b, any processing result flag indicates an irregular termination, the director program 75 sets the corresponding state flag 76c in the environment table 76 (FIG. 43) to an unusable state in Step S3805. For the search request received from the terminal after then, the director program 75 asks only the usable receptionist server for search request. So much for the explanations about the second embodiment.

Here, supplementary explanations about record number (No.) are given. Record No. is maintained as a record component in the search-target character string data. However, since search conditions are made by comparing character strings, it is not always necessary to have record No., but record No. was shown above to explain the array and division of records.

In fact, when the receptionist server makes the responding table in order to distribute records in each search processing apparatus as search regions of the search-target character string data, character strings are read in one after another from the top of the search-target character string data, so if the top of the records is known, the record No's. are recorded in the table one after another, and the position on the file (search-target character string data) and the length of records can be recorded.

Also, since the receptionist server maintains the responding table, the allocation and re-allocation of a search region to each search processing apparatus can be easily carried out using serial record No's.

In the explanations of the above-mentions embodiment, data update were taken up as a maintenance work of the search-target character string data which is being searched. However, it is made possible to execute not only data addition and change but also deletion of the search-target character string data during search processing by providing a deletion flag, though not shown in the update file response table (FIG. 20), so that the deletion flag may be used by prior art.

Also, the updated data is preferentially selected based on the judgement of the record of the same record No. found out in each region of both the update file and the search-target character string data which each search processing apparatus searches. This judgement can be made by recording the update flag in a table such as the responding table.

This may be applied to the method of reflecting addition, change, or deletion of data to the search-target character string data by the update result reflection unit (FIG. 1).

Executing search processing on files was more practical as a conventional method of handling the search target data of which each search server takes charge. In the embodiments of the present invention, data of each allocated region is once developed on the memory of the search server, and then search of character strings is executed. With regard to the update file, however, when the number of records stored in the update file is small, search may be executed on files as in the conventional method, and the data is not developed on the memory in the above-mentioned embodiments. When the number of records stored in the update file is large, search of character strings maybe executed by developing search data in the program storage device for the search server in charge of the update file in the same way as for other search servers.

In the embodiments of the present invention, each search processing apparatus is a server, which is connected to the receptionist server via a network. Even if the method of connecting the apparatus which receives search request and the apparatus which executes search processing by means of other connecting methods such as high-speed link, the same effect can be expected.

What is claimed is:

1. A full text search system, comprising:
 a plurality of search processing apparatuses receiving instructions related to locations of search-target character string data and character string search conditions, and outputting search results responsive to the instructions and at the locations of the search-target character string data accordingly;
 a search integration unit having search-target character string data divided into a group of character string records and allocated to one or more of the plurality of search processing apparatuses, correspondingly transmitting character string search conditions to each of the search processing apparatuses as search instructions for executing a search using the group of character string records as a series of individual target data, and integrating search results received from each of the search processing apparatuses;
 an update temporary memory unit temporarily storing new character string records to update the search-target character string data; and
 an update record search instruction unit transmitting the new character string records stored in the update temporary memory unit to any one of the search processing apparatuses in advance as a part of the search-target character string data.

2. The full text search system according to claim 1, further comprising:
 an update result reflection unit in which old records before being updated corresponding to the new records stored in the update temporary memory unit is deleted from the search-target character string data, and the new records are incorporated into the search-target character string data.

3. The full text search system according to claim 2, further comprising:
 a search result receiving time storing unit in which after the search integration unit transmits search instructions to the plurality of search processing apparatuses, the time when search results are received from each search processing apparatus is stored; and
 a breakdown search processing apparatus judgement unit in which the search processing apparatus which cannot receive search results within a preset time from the search result receiving time received first which is stored in the search result receiving time storing unit is judged to be a defective apparatus.

4. The full text search system according to claim 3, wherein when the breakdown search processing apparatus judgement unit judges the search processing apparatus to be defective, the search integration unit revokes all the search results transmitted from the plurality of search processing apparatuses, and after incorporating the new records stored in the update temporary memory unit into the search-target character string data by instructing the update result reflection unit, the search integration unit divides the search-target character string data and allocates the divided data to usable search processing apparatuses except the search processing apparatuses which are judged to be defective and the search processing apparatuses which have been instructed to execute search processing by the update record search instruction unit, and instructs the usable search processing apparatuses to execute search.

5. A full text search program which causes a computer to execute operations to function as a full text search system, said operations comprising:
 causing a plurality of search processing apparatuses to receive instruction related to locations of the search-target character string data and character string search conditions are instructed, and to accordingly output search results responsive to the instructions and at the locations of the search-target character string data;
 causing a search integration unit having search-target character string data divided into a group of character string records and allocated to one or more of the plurality of search processing apparatuses, to correspondingly transmit character string search conditions to each of the search processing apparatuses as search instructions for executing a search using the group of character string records as a series of individual target data, and to integrate search results received from each of the search processing apparatuses;
 causing an update temporary memory unit to temporarily store new character string records to update the search-target character string data; and
 causing an update record search instruction unit to transmit the new character string records stored in the update temporary memory unit to any one of the search processing apparatuses in advance as a part of the search-target character string data.

6. A computer readable storage medium storing a program to cause a computer to execute operations related to a full text search, comprising:
 causing a plurality of search processing apparatuses to receive instructions related to locations of the search-target character string data and character string search conditions, and to output search results responsive to the instructions and at the locations of the search-target character string data accordingly;
 causing a search integration unit having search-target character string data divided into a group of character string records to have the character string records allocated to one or more of the plurality of search processing apparatuses, to correspondingly transmit character string search conditions to each of the search processing apparatuses as search instructions for executing a search using the group of character string records as a series of individual target data, and to integrate search results received from each of the search processing apparatuses;
 causing an update temporary memory unit to temporarily store new character string records to update the search-target character string data; and
 causing an update record search instruction unit to transmit the new character string records stored in the update temporary memory unit to any one of the search processing apparatuses in advance as a part of the search-target character string data.

7. A full text search system having a search integration server receiving instructions related to locations of search-target character string data and character string search conditions, comprising:
 a plurality of search processing servers outputting search results responsive to the instructions connected via a network, the search-target character string data being divided into a group of character string records and allocated to one or more of the plurality of search processing servers and the character string search conditions being transmitted to each of the search processing servers as search instructions for executing a search using the group of character string records as a series of individual target data, and search results received from each of the search processing servers being integrated;

an update temporary memory unit temporarily storing new character string records to update the search-target character string data; and an update record search instruction unit transmitting the new character string records stored in the update temporary memory unit to any one of the search processing apparatuses in advance as a part of the search-target character string data.

8. A full text search method, comprising:

dividing search-target character string data into a group of character string records;

allocating the divided character string records to one or more of a plurality of search processing apparatuses which are given locations of search-target character string data and character string search conditions and outputting search results responsive to the given locations and conditions at the locations of the search-target character string data;

transmitting given character string search conditions to each of the search processing apparatuses as search instructions, executing a search using the group of character string records as a series of individual target data, receiving search results from each of the search processing apparatuses, and integrating the search results;

temporarily storing, when updating the search-target character string data, new character string records to update the search-target character string data; and instructing the stored character string records to any one of the search processing apparatuses determined in advance as a part of the search-target character sting data.

9. A full text search method, comprising:

receiving a plurality of search requests from terminals requesting to search target data having character strings;

executing the plurality of search requests from the terminals in parallel via a plurality of search processing apparatuses; and automatically adding new data to the target data based on at least one request from at least one of the terminals while the plurality of search requests are processed, wherein the target data is logically divided into regions to correspond to the plurality of search processing apparatuses, the regions are allocated to the plurality of search processing apparatuses for executing searches using the logically divided regions as a series of individual target data based on the plurality of search requests and at the locations of the search-target character string data.

* * * * *

UNITED STATES PATENT AND TRADEMARK OFFICE
CERTIFICATE OF CORRECTION

| | | |
|---|---|---|
| PATENT NO. | : 7,080,069 B2 | Page 1 of 1 |
| APPLICATION NO. | : 10/083469 | |
| DATED | : July 18, 2006 | |
| INVENTOR(S) | : Fumirou Abe et al. | |

It is certified that error appears in the above-identified patent and that said Letters Patent is hereby corrected as shown below:

Column 18, Line 6, Change "sting" to --string--.

Signed and Sealed this

Nineteenth Day of February, 2008

JON W. DUDAS
*Director of the United States Patent and Trademark Office*